United States Patent
Zhu et al.

(10) Patent No.: US 12,017,836 B2
(45) Date of Patent: Jun. 25, 2024

(54) THERMOPLASTIC BAGS WITH LIQUID DIRECTING STRUCTURES

(71) Applicant: The Glad Products Company, Oakland, CA (US)

(72) Inventors: Ranyi Zhu, Willowbrook, IL (US); Michael G. Borchardt, Willowbrook, IL (US); Robert T. Dorsey, Willowbrook, IL (US); Jason R. Maxwell, Willowbrook, IL (US); Edward B. Tucker, Willowbrook, IL (US); Shaun T. Broering, Fort Thomas, KY (US); Deborah K. Fix, Maineville, OH (US)

(73) Assignee: The Glad Products Company, Oakland, CA (US)

( * ) Notice: Subject to any disclaimer, the term of this patent is extended or adjusted under 35 U.S.C. 154(b) by 795 days.

(21) Appl. No.: 17/049,857

(22) PCT Filed: May 7, 2019

(86) PCT No.: PCT/US2019/031086
§ 371 (c)(1),
(2) Date: Oct. 22, 2020

(87) PCT Pub. No.: WO2019/217400
PCT Pub. Date: Nov. 14, 2019

(65) Prior Publication Data
US 2021/0130070 A1    May 6, 2021

Related U.S. Application Data

(60) Provisional application No. 62/668,566, filed on May 8, 2018.

(51) Int. Cl.
*B65D 81/26* (2006.01)
*B31B 70/74* (2017.01)
(Continued)

(52) U.S. Cl.
CPC ............ *B65D 81/261* (2013.01); *B31B 70/79* (2017.08); *B65D 33/02* (2013.01); *B65D 33/28* (2013.01); *B65D 81/264* (2013.01); *B65F 1/0006* (2013.01)

(58) Field of Classification Search
CPC ...... B31B 70/79; B65D 81/261; B65D 33/02; B65D 33/28; B65D 81/264; B65D 33/00;
(Continued)

(56) References Cited

U.S. PATENT DOCUMENTS 2,605,896 A * 8/1952 Rohdin .............. B65D 81/3272
426/112
2,800,269 A * 7/1957 Smith .................. B65D 31/145
383/44
(Continued)

OTHER PUBLICATIONS

Office action as received in Chinese application 2019900008616 dated Sep. 15, 2021 [No English Translation Available].
(Continued)

*Primary Examiner* — Gideon R Weinerth
(74) *Attorney, Agent, or Firm* — Keller Preece PLLC

(57) ABSTRACT

A thermoplastic bag includes structures that direct liquid away from areas of the bag more susceptible to failure and leaking. For example, one or more implementations include seals that direct liquid introduced into the bag away from corners of the bag. Additionally, one or more implementations include an insert positioned within the bag between the liquid directing structures such that the liquid directing structures direct liquid to the insert. In one or more implementations, the insert comprises an absorbent material. Thus, the liquid directing structures can direct liquid to a liquid absorbing insert.

20 Claims, 14 Drawing Sheets

(51) Int. Cl.
  *B65D 3/00* (2006.01)
  *B65D 30/10* (2006.01)
  *B65D 33/02* (2006.01)
  *B65D 33/28* (2006.01)
  *B65F 1/00* (2006.01)

(58) Field of Classification Search
  CPC ........ B65D 31/16; B65D 31/12; B65D 31/10; B65F 1/0006; B65F 2210/1023; B65F 2210/102
  USPC ........ 206/204, 219, 221; 383/903, 120, 107, 383/38–40, 121
  See application file for complete search history.

(56) References Cited

U.S. PATENT DOCUMENTS

| | | | | |
|---|---|---|---|---|
| 3,372,857 | A * | 3/1968 | Brayla | B65D 33/02 493/201 |
| 3,454,211 | A * | 7/1969 | Hoffman | B65D 33/00 426/106 |
| 4,619,361 | A * | 10/1986 | Thomas, Jr. | B65D 81/264 206/204 |
| 4,742,908 | A * | 5/1988 | Thomas, Jr. | B65D 81/264 206/204 |
| 4,759,642 | A * | 7/1988 | Van Erden | B65D 31/00 383/211 |
| 4,815,590 | A * | 3/1989 | Peppiatt | B65D 81/264 206/204 |
| 4,946,290 | A * | 8/1990 | Matyja | B65D 33/1683 383/22 |
| 5,199,795 | A * | 4/1993 | Russo | B65D 85/84 604/408 |
| 5,404,999 | A * | 4/1995 | Bednar | A01K 1/0107 383/33 |
| 5,415,475 | A * | 5/1995 | Sandy | A61J 19/00 383/77 |
| 5,660,868 | A * | 8/1997 | Yeager | B65D 81/264 426/112 |
| 5,788,121 | A | 8/1998 | Sasaki et al. | |
| 5,839,572 | A * | 11/1998 | Yeager | B65D 31/12 493/194 |
| 5,845,769 | A * | 12/1998 | Yeager | B65D 31/12 206/204 |
| 6,053,635 | A * | 4/2000 | Anderson | B65D 33/08 383/906 |
| 6,089,367 | A * | 7/2000 | Anderson | B65D 81/264 206/204 |
| 6,298,983 | B1 * | 10/2001 | Yeager | B65D 81/264 493/193 |
| 6,530,471 | B1 * | 3/2003 | Tsuyuguchi | B65D 81/264 493/189 |
| 6,966,697 | B2 * | 11/2005 | Patridge | B65D 33/1608 220/495.11 |
| 7,018,099 | B2 * | 3/2006 | Caudle | B29C 66/244 383/906 |
| 7,055,683 | B2 * | 6/2006 | Bourque | B29C 65/76 604/416 |
| 7,207,717 | B2 * | 4/2007 | Steele | B31B 70/00 383/104 |
| 7,878,711 | B2 * | 2/2011 | Morita | B65D 31/16 383/107 |
| 8,251,971 | B2 * | 8/2012 | Graf | A61M 1/167 604/416 |
| 8,272,782 | B2 * | 9/2012 | Chum | B65D 31/00 383/107 |
| 8,573,845 | B2 * | 11/2013 | Turover | B65D 81/261 383/19 |
| 8,613,547 | B2 * | 12/2013 | Steele | B65D 33/01 383/38 |
| 8,757,405 | B2 * | 6/2014 | Snyder | A61J 9/001 215/11.4 |
| 9,132,938 | B2 * | 9/2015 | Tucker | B65F 1/0006 |
| 9,637,278 | B2 * | 5/2017 | Borchardt | B65D 33/28 |
| 9,650,178 | B2 * | 5/2017 | Maglio, Jr. | B65D 33/2508 |
| D924,070 | S * | 7/2021 | Zhu | D9/706 |
| 11,345,118 | B2 * | 5/2022 | Wilcoxen | B32B 7/05 |
| 11,650,186 | B2 * | 5/2023 | Ferracane | G01N 31/222 116/206 |
| 2002/0079238 | A1 * | 6/2002 | Wilson, Jr. | B65D 81/264 206/204 |
| 2003/0057114 | A1 * | 3/2003 | Brander | B65D 81/264 220/571 |
| 2003/0059128 | A1 * | 3/2003 | Vangedal-Nielsen | B65D 81/261 383/7 |
| 2003/0226773 | A1 * | 12/2003 | Shaffer | B65F 1/0006 206/204 |
| 2004/0141665 | A1 * | 7/2004 | Yung | B65D 31/10 383/107 |
| 2004/0188463 | A1 * | 9/2004 | Harris, Jr. | B65D 77/065 222/105 |
| 2005/0037164 | A1 | 2/2005 | Wu et al. | |
| 2006/0233468 | A1 * | 10/2006 | Jacoby | B65F 1/0006 206/524.5 |
| 2006/0233469 | A1 * | 10/2006 | Jacoby | B65F 1/0006 206/524.5 |
| 2006/0233470 | A1 * | 10/2006 | Jacoby | B65F 1/0006 206/524.4 |
| 2007/0189640 | A1 * | 8/2007 | Linton | B65D 31/12 383/17 |
| 2007/0217717 | A1 * | 9/2007 | Murray | B65D 33/14 383/38 |
| 2008/0175521 | A1 * | 7/2008 | Morita | B65D 31/16 383/120 |
| 2010/0016825 | A1 | 1/2010 | Graf et al. | |
| 2010/0187135 | A1 * | 7/2010 | Broering | B65F 1/0006 206/524.2 |
| 2011/0085748 | A1 | 4/2011 | Turvey et al. | |
| 2011/0182530 | A1 * | 7/2011 | Park | B65D 81/3266 383/38 |
| 2012/0057811 | A1 * | 3/2012 | Tucker | B65D 31/04 383/72 |
| 2012/0269467 | A1 * | 10/2012 | Bjerring | B65D 75/5811 383/105 |
| 2013/0188888 | A1 * | 7/2013 | Liu | B65F 1/002 383/38 |
| 2013/0188889 | A1 * | 7/2013 | Fraser | B65F 1/0006 383/37 |
| 2013/0188891 | A1 * | 7/2013 | Maxwell | B65F 1/002 383/114 |
| 2014/0004227 | A1 * | 1/2014 | Tran | A45D 37/00 426/112 |
| 2015/0203291 | A1 * | 7/2015 | Saville | B65D 81/265 206/204 |
| 2015/0298862 | A1 * | 10/2015 | Borchardt | A61F 7/08 383/112 |
| 2016/0176579 | A1 * | 6/2016 | Brauer | B31B 70/00 493/227 |
| 2018/0118415 | A1 * | 5/2018 | Jean-Mary | B31B 70/8134 |
| 2020/0262172 | A1 * | 8/2020 | Tucker | B31B 70/88 |
| 2020/0361683 | A1 * | 11/2020 | Goglio | B65D 33/02 |
| 2021/0130070 | A1 * | 5/2021 | Zhu | B32B 27/306 |
| 2022/0219889 | A1 * | 7/2022 | Stiglic | B65D 33/004 |
| 2022/0402679 | A1 * | 12/2022 | Watson | B65B 25/001 |
| 2023/0137399 | A1 * | 5/2023 | Donner | B65D 81/264 206/204 |
| 2023/0159230 | A1 * | 5/2023 | Maxwell | B65D 33/02 383/75 |

OTHER PUBLICATIONS

Office action as received in Chinese application 2019900008616 dated Dec. 28, 2021. [No English Translation Available].
International Search Report and Written Opinion as received in PCT/US2019/031086 dated Aug. 26, 2019.

(56) References Cited

OTHER PUBLICATIONS

Examination Report as received in Australian application 2019265526 dated Jul. 25, 2022.

* cited by examiner

THERMOPLASTIC BAGS WITH LIQUID DIRECTING STRUCTURES

CROSS-REFERENCE

This application is a 35 U.S.C. 371 national phase of PCT International Application No. US2019/31086, filed on May 7, 2019, which claims the benefit of and priority to U.S. Provisional Application No. 62/668,566, filed on May 8, 2018. The disclosures are herein incorporated by reference in their entirety.

BACKGROUND

1. Technical Field

The present application relates generally to thermoplastic bags and methods of making thermoplastic bags. More particularly, the present application relates to thermoplastic bags including liquid directing structures and optionally reinforcing and/or absorbing structures.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

The cost to produce products including thermoplastic film is directly related to the cost of the thermoplastic film. Recently the cost of thermoplastic materials has risen. In response, many manufacturers attempt to control manufacturing costs by decreasing the amount of thermoplastic material in a given product.

One way manufacturers may attempt to reduce production costs is to use thinner films or stretch the thermoplastic films, thereby increasing surface area and reducing the amount of thermoplastic film needed to produce a product of a given size. Unfortunately, stretched or otherwise thinner thermoplastic films can have undesirable properties. For example, thinner thermoplastic films are typically more transparent or translucent. Additionally, consumers commonly associate thinner films with weakness. Such consumers may feel that they are receiving less value for their money when purchasing products with thinner films; and thus, may be dissuaded to purchase thinner thermoplastic films.

As such, manufacturers may be dissuaded to stretch a film or use thinner films despite the potential material savings. This is particularly the case when strength is an important feature in the thermoplastic product. For example, thermoplastic trash bags need to be puncture and tear resistant to avoid inadvertently spilling any contents during disposal. The liquid impervious nature of the thermoplastic materials is desirable for retaining liquids and juices that are often the by-products of discarded garbage. Nonetheless, leaks may develop even in the sturdiest of bags due to puncturing of the thermoplastic sidewall material or failure at the seams. Such leakage, as will be appreciated, allows liquids to drain to the bottom of the garbage can or directly onto the floor or ground when the bag is being removed.

Another common use for thermoplastic bags is in the field of food storage. Again, such bags are typically made of a thermoplastic material where the liquid impervious nature of the thermoplastic material helps retain liquids and juices that may be associated with the stored food items, thereby, both preserving the food items and avoiding messes arising from leakage. Of course, because of particularly harsh applications or through common wear and tear, storage bags used in the food industry may still develop leaks undermining the foregoing accomplishments.

Accordingly, continued improvement is needed to address the unique problems associated with bags while conserving the use of expensive thermoplastic materials.

BRIEF SUMMARY

One or more implementations of the present invention provide benefits and/or solve one or more of the foregoing or other problems in the art with thermoplastic bags with liquid directing structures. In particular, in one or more implementations, a thermoplastic bag includes structures that direct liquid away from areas of the bag more susceptible to failure and leaking. For example, one or more implementations include liquid directing structure that direct liquid introduced into the bag away from corners of the bag.

Additionally, one or more implementations further include an insert positioned within the bag between the liquid directing structures. The insert can optionally reinforce the bottom of the bag. Furthermore, in one or more implementations, the insert comprises an absorbent material. Thus, the liquid directing structures can direct liquid to the liquid absorbing insert at the bottom of the bag. Because liquid directing structures can reduce an effective length of the bottom surface of the interior bag, an insert of reduced size and span the entire effective length of the bag, thereby reducing cost and increasing absorption efficiency.

Additional feature and advantages of exemplary implementations of the present invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific implementations thereof that are illustrated in the appended drawings. It should be noted that the figures are not drawn to scale, and that elements of similar structure or function are generally represented by like reference numerals for illustrative purposes throughout the figures. Understanding that these drawings depict only typical implementations of the invention and are not therefore to be considered to be limiting of its scope, the invention will be described and explained with additional specificity and detail through the use of the accompanying drawings in which.

DETAILED DESCRIPTION

Figure 1:
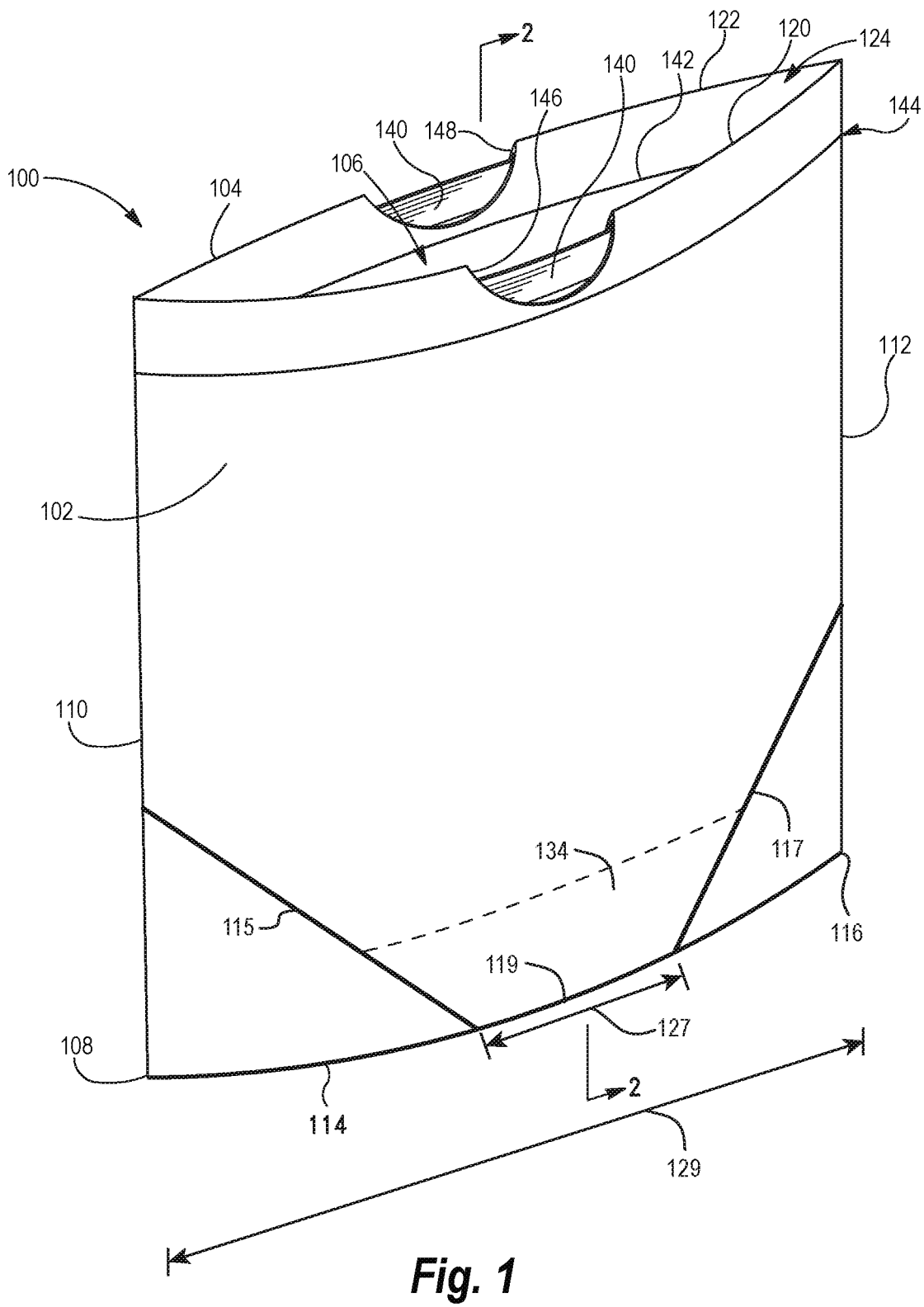
FIG. 1 illustrates a perspective view of a thermoplastic bag with liquid directing structures in accordance with one or more implementations of the present invention.

One or more implementations of the present disclosure comprise thermoplastic bags with liquid directing structures. In particular, in one or more implementations, a thermoplastic bag includes structures that direct liquid away from areas of the bag more susceptible to failure and leaking. More specifically, one or more implementations include liquid directing seals that extend from a side seal to a bottom center of the thermoplastic bag. More specifically, the liquid directing seals can direct liquid away from the corners of the thermoplastic bag. For example, the liquid directing seals can prevent liquid from reaching the corners of the thermoplastic bag by sealing the corners of the thermoplastic bag off from the rest of the thermoplastic bag. Thus, the thermoplastic bag with liquid directing seals can help reduce or eliminate leaks by preventing liquid from reaching the corners of the thermoplastic bag where, due to stress concentrations, leaks are prone to occur.

Additionally, one or more implementations further include an insert positioned within the bag between the liquid directing seals. The insert can reinforce the bottom of the bag. Furthermore, in one or more implementations, the insert comprises an absorbent material. In particular, the liquid absorbing insert can comprise an absorbent agent, such as a super absorbent polymer, that is capable of absorbing and retaining many times its own weight in fluids. Thus, the liquid directing seals can direct liquid to the liquid absorbing insert at the bottom of the bag that then absorbs the liquid.

In one or more implementations, the liquid directing seals reduce an effective length of the bottom surface of the bag interior by sealing off the corners of the thermoplastic bag. Due to the reduced length of the bottom surface of the interior of the bag, one or more implementations include thermoplastic bags with inserts that run across an entire length of the effective interior bottom surface of the thermoplastic bag yet still are of reduced size, and therefore, reduced cost, compared to an insert that runs from one corner of the bag to the opposing corner of the bag.

Film Materials

As an initial matter, the thermoplastic material of the films of one or more implementations can include, but are not limited to, thermoplastic polyolefins, including polyethylene and copolymers thereof and polypropylene and copolymers thereof. The olefin based polymers can include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber.

The examples and description herein below refer to films formed from linear low-density polyethylene. The term "linear low-density polyethylene" (LLDPE) as used herein is defined to mean a copolymer of ethylene and a minor amount of an olefin containing 4 to 10 carbon atoms, having a density of from about 0.910 to about 0.926, and a melt index (MI) of from about 0.5 to about 10. For example, some examples herein use an octene comonomer, solution phase LLDPE (MI=1.1; ρ=0.920). Additionally, other examples use a gas phase LLDPE, which is a hexene gas phase LLDPE formulated with slip/AB (MI=1.0; ρ=0.920). Still further examples use a gas phase LLDPE, which is a hexene gas phase LLDPE formulated with slip/AB (MI=1.0; ρ=0.926). One will appreciate that the present invention is not limited to LLDPE, and can include "high density polyethylene" (HDPE), "low density polyethylene" (LDPE), and "very low density polyethylene" (VLDPE). Indeed, films made from any of the previously mentioned thermoplastic materials or combinations thereof can be suitable for use with the present invention.

Indeed, implementations of the present invention can include any flexible or pliable thermoplastic material that may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable. In addition to a thermoplastic material, films of one or more implementations of the present invention can also include one or more additives. Additional additives that may be included in one or more implementations include pigments, slip agents, anti-block agents, voiding agents, or tackifiers.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

One will appreciate in light of the disclosure herein that manufacturers may form the films or webs to be used with one or more implementations of the present invention using a wide variety of techniques. For example, a manufacturer can form precursor mix of the thermoplastic material and one or more additives. The manufacturer can then form the film(s) from the precursor mix using conventional flat or cast extrusion or co-extrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by the two-conventional film-making processes; casting and blowing. Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (monoaxial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, one or more films of the present invention are blown film, or cast film. Blown film and cast film is formed by extrusion. The extruder used can be a conventional one using a die, which will provide the desired gauge. Some useful extruders are described in U.S. Pat. Nos. 4,814,135; 4,857,600; 5,076,988; 5,153,382; each of the foregoing patent are incorporated herein by reference in their entirety. Examples of various extruders, which can be used in producing the films to be used with the present invention, can be a single screw type modified with a blown film die, an air ring, and continuous take off equipment.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more implementations, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more implementations the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more implementations the polymer chains of the blown film are predominantly oriented in the machine direction (i.e., oriented more in the machine direction than the transverse direction).

The films of one or more implementations of the present invention can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.35 mils and about 0.6 mils. Additionally, the starting gauge of films of one or more implementations of the present invention may not be uniform. Thus, the starting gauge of films of one or more implementations of the present invention may vary along the length and/or width of the film.

As an initial matter, one or more films described herein can comprise any flexible or pliable material comprising a thermoplastic material and that can be formed or drawn into a web or film. As described above, the film can include a plurality of layers of thermoplastic films. Thus, a film, as used herein, may itself include a single layer or multiple layers. Adjacent layers of an individual film may be coextruded. Co-extrusion results in tight bonding so that the bond strength is greater than the tear resistance of the resulting film.

More specifically, a film can comprise a single layer, two layers (i.e., a bi-layered film), three layers (i.e., a tri-layered film), or more than three layers. For example, a tri-layer film can include an A:B:C configuration in which all three layers vary in one or more of gauge, composition, color, transparency, or other properties. Alternatively, a tri-layer film can comprise an A:A:B structure or A:B:A structure in which two layers have the same composition, color, transparency, or other properties. In an A:A:B structure or A:B:A structure the A layers can comprise the same gauge or differing gauge. For example, in an A:A:B structure or A:B:A structure the films can comprise layer ratios of 20:20:60, 40:40:20, 15:70:15, 33:34:33, 20:60:20, 40:20:40, or other ratios. Another example three-layer film is a B:A:B structure, where the ratio of layers can be 20:60:20. In one or more embodiments, the exterior B layers comprise a mixture of hexene LLDPE of density 0.918, and metallocene LLDPE of density 0.920 and the interior A core layer (11$d$) comprise a mixture of hexene LLDPE of density 0.918, butene LLDPE of density 0.918, reclaimed resin from trash bags. In another example tri-layer film is a coextruded three-layer B:A:B structure where the ratio of layers is 15:70:15. The B:A:B structure can also optionally have a ratio of B:A that is greater than 20:60 or less than 15:70. In one or more implementations, the LLDPE can comprise greater than 50% of the overall thermoplastic material in the film.

Referring now to the Figures, FIG. 1 illustrates a thermoplastic bag with liquid directing structures 100. While the bags of one or more implementations are generally capable of holding a vast variety of different contents, the thermoplastic bag with liquid directing structures 100 illustrated in FIG. 1 may be sized and configured to be used as a liner for a garbage can or similar refuse container. In other implementations, thermoplastic bags with liquid directing structures can be sized and configured for other uses, such as food containers, etc.

The thermoplastic bag with liquid directing structures 100 includes a first sidewall 102 and a second sidewall 104. The first and second side walls 102, 104 can each comprise a film of thermoplastic material as described above. The first and second sidewalls 102, 104 can be joined together along a first side edge 110, an opposing second side edge 112, and along a bottom edge 114. The bottom edge 114 can extend between the first and second side edges 110, 112. The first and second sidewalls 102, 104 may be joined along the first and second side edges 110, 112 and bottom edge 114 by any suitable process such as, for example, a heat seal. In one or more implementations, the bottom edge 114 of one or more of the side edges 110, 112 can comprise a fold. For example, the side edges 110, 112 can be joined by heat seals and the bottom edge 114 can comprise a fold.

To allow access to the interior volume of the thermoplastic bag 100, at least a portion of top edges 120, 122 of the first and second sidewalls 102, 104 may be un-joined to define an opening 124. The opening 124 can be opposite the bottom edge 114. When placed in a trash receptacle, the top edges 120, 122 of the first and second sidewalls 102, 104 may be folded over a rim of the receptacle.

The thermoplastic bag with liquid directing structures 100 also optionally includes a closure mechanism located adjacent to the upper edges 120, 122 for sealing the top of the thermoplastic bag 100 to form a fully-enclosed container or vessel. As shown by FIG. 1, the closure mechanism can comprise a draw tape 140. To accommodate the draw tape 140 the first top edge 120 of the first sidewall 102 may be folded back into the interior volume 106 and may be attached to the interior surface of the sidewall by a heat seal to form a first hem 144. Similarly, the second top edge 122 of the second sidewall 104 may be folded back into the interior volume and may be attached to the second sidewall 104 by a heat seal to form a second hem 142.

As shown by FIG. 1, in one or more implementations, the draw tape 140 extends through the first and second hems 142, 144 and along the first and second top edge 120, 122. To access the draw tape 140, first and second notches 146, 148 may be disposed through the respective first and second top edges 120, 122. Pulling the draw tape 140 through the notches 146, 148 will constrict the first and second top edge 120, 122 thereby closing or reducing the opening 124. The draw tape 140 can be secured to the side edges 110, 112 by a heat seal (e.g., a tape seal). The draw tape closure may be used with any of the implementations of a thermoplastic bag with liquid directing structures described herein. One will appreciate in light of the disclosure herein that the present invention is not limited to draw tape closure mechanisms. In alternative implementations, the closure mechanism can comprise flaps, adhesive tapes, a tuck and fold closure, an interlocking closure (e.g., a zipper), a slider closure, or other closure structures.

As shown by FIG. 1, the thermoplastic bag with liquid directing structures 100 can include liquid directing structures 115, 117. In particular, the thermoplastic bag with liquid directing structures 100 comprises a first liquid directing seal 115 extending from the first side edge 112 (or first side seal) to the bottom edge 114. The thermoplastic bag with liquid directing structures 100 also comprises a second liquid directing seal 117 extending from the second side edge 112 (or second side seal) to the bottom edge 114. In alternative embodiments, the liquid directing structures can comprise portions of the thermoplastic bag that are bonded together by means other than seals (an adhesive, pressure bonding (SELFing, ring rolling), or ultrasonic bonds, etc.). More specifically, in one or more embodiments, the liquid directing structures can comprise bonds formed by SELFing. In one or more embodiments, such liquid directing structures can be tailored with a bond strength so they do not separate or tailored with a bond strength such that they evenly break, and thereby, eventually provide access to the corners 108, 116.

The first and second liquid directing seals 115, 117 can each seal off, or isolate, the corners 108, 116 of the thermoplastic bag with liquid directing structures 100. Thus, the liquid directing seals 115, 117 can direct liquid away from the corners 108, 116 of the thermoplastic bag with liquid directing structures 100. For example, the liquid directing seals 115, 117 can prevent liquid from reaching the corners 108, 116 of the thermoplastic bag 100. The thermoplastic bag with liquid directing seals 100 can help reduce or eliminate leaks by preventing liquid from reaching the corners 108, 116 of the thermoplastic bag 100. As corners of bag are one of the most likely portion of a bag to leak, the thermoplastic bag with liquid directing structures 100 can reduce or eliminate leaking. In one or more further embodiments, the corners 108, 116 of the thermoplastic bag 100 are removed. In other words, the material of the side walls below the liquid directing seals 115, 117 can be removed such that the liquid directing seals 115, 117 form part of the outer boundary of the thermoplastic bag 100.

By sealing off the corners 108, 116, the first and second liquid directing seals 115, 117 can effectively reduce a length of the bottom edge 114. In particular, the bottom edge 114 can have a length 129 extending from the first corner 108 to the second corner 116. A length 127 of the effective interior bottom edge 119 can extend from an intersection of the first liquid directing seal 115 and the bottom edge 114 to an intersection of the second liquid directing seal 117 and the bottom edge 114. The effective interior bottom edge 119 thus has a shorter length 127 that the length 129 of the bottom edge 114.

In one or more implementations, the length 127 of the effective interior bottom edge 119 is 50% of the length 129 of the bottom edge 114. In alternative implementations, the length 127 of the effective interior bottom edge 119 can be less than 50% of the length 129 of the bottom edge 114. For example, the length 127 of the effective interior bottom edge 119 can be 45%, 40%, 35%, 30%, 25%, 20%, or 15% of the length 129 of the bottom edge 114. In alternative implementations, the length 127 of the effective interior bottom edge 119 can be greater than 50% of the length 129 of the bottom edge 114. For example, the length 127 of the effective interior bottom edge 119 can be 55%, 60%, 65%, 70%, 75%, 80%, or 85% of the length 129 of the bottom edge 114.

As mentioned above, the thermoplastic bag with liquid directing structures 100 can include an insert within its interior. For example, FIG. 1 illustrates that the thermoplastic bag with liquid directing structures 100 can include an insert 134 positioned along the effective interior bottom edge 119 (the dotted line illustrates that the insert is within the interior of the thermoplastic bag 100. Due to the reduced length 127 of the effective interior bottom edge 119, the insert 134 can have a length smaller than the length 129 of the bottom edge 114, while still covering the entire effective interior bottom edge 119. The liquid directing seals 115, 117 can allow for a smaller and less expensive insert that still is capable of absorbing all or most of any liquid at the bottom of the thermoplastic bag 100.

The insert 134 can comprise absorbent materials as explained in greater detail below. By absorbing liquid, the insert 134 can reduce or prevent liquid from leaking from the bag 100. The insert 134 can increase the mass of the bag 100 along the effective interior bottom edge 119, and thus, reduce or prevent leaking. In particular, the additional layer (s) provided by the insert 134 can further reinforce the bottom of the bag and reduce tearing and puncture, and therefore, reduce or eliminate leaking.

Figure 2A:
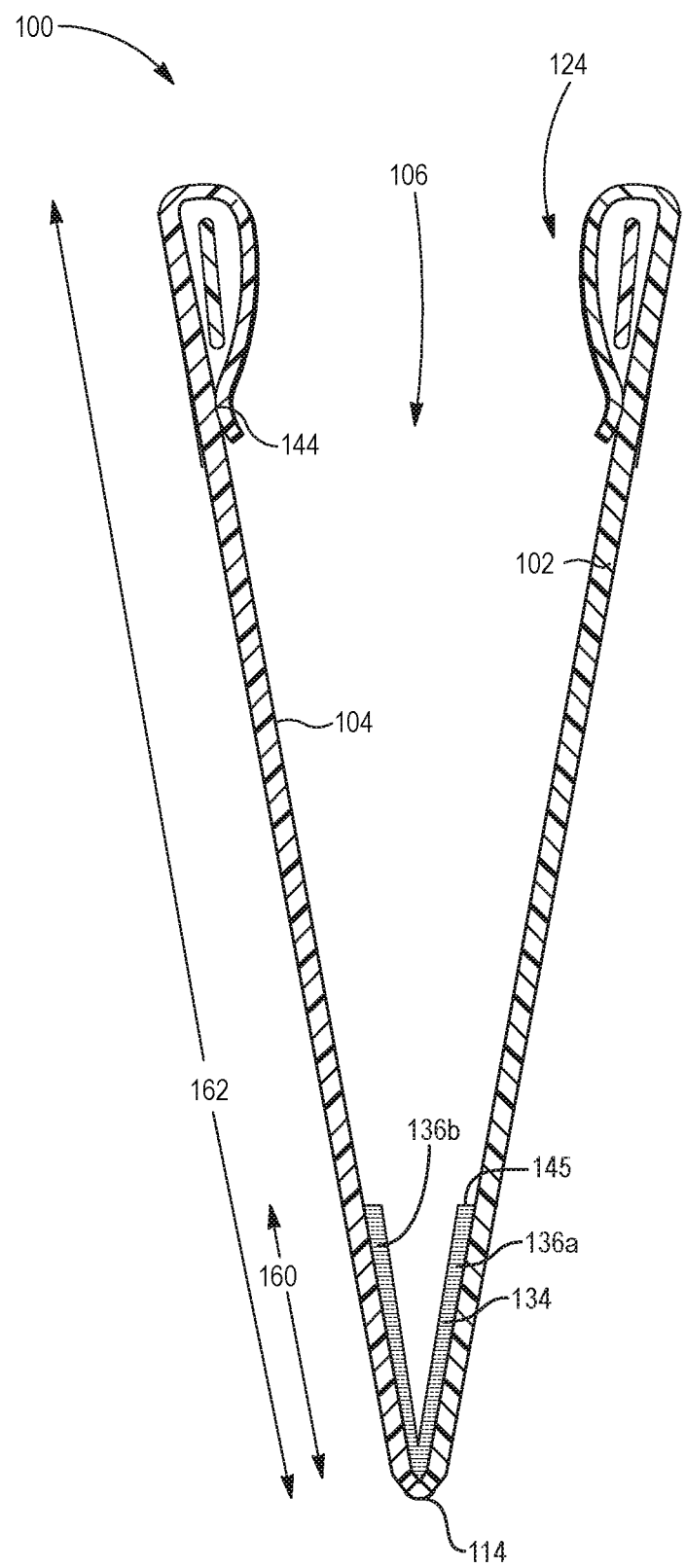
FIG. 2A illustrates one implementation of a cross-sectional view of the thermoplastic bag with liquid directing seals of FIG. 1, having a liquid absorbing insert, taken along the section line 2-2 of FIG. 1.

FIG. 2A illustrates a cross-sectional view of an implementation the thermoplastic bag with liquid directing structures 100 taken along the line 2-2 of FIG. 1. As shown, the insert 134 can be positioned adjacent to the bottom edge 114. In other words, the insert 134 can directly abut against the bottom edge 114. The insert 134 may be bonded to the bag sidewalls 102, 104 along the entire height 160 of the insert 134. Alternately, the insert 134 may only be bonded along the top edge 145.

More particularly, the insert 134 can include a first half 136a that extends along, and is laminated, to the first sidewall 102. Similarly, the insert 134 can include a second half 136b that extends along, and is laminated to, the second sidewall 104. The first and second halves 136a, 136b can extend from the bottom edge 114 toward the opening 124. As used herein, the terms "lamination," "laminate," and "laminated film," refer to the process and resulting product made by bonding together two or more layers of film or other material. The term "bonding" may be used interchangeably with "lamination." As a verb, "laminate" means to affix or adhere (by means of, for example, adhesive bonding, pressure bonding, ultrasonic bonding, corona lamination, heat lamination, and the like) two or more separately made articles to one another so as to form a multi-layer structure. As a noun, "laminate" means a product produced by the affixing or adhering as just described.

As shown by FIG. 2A, the thermoplastic bag with liquid directing structures 100 may have a height 162 measured between the bottom edge 114 and the opening 124. The height 162 of the bag 100 may have a first range of about 20 inches (50.8 cm) to about 48 inches (121.9 cm), a second range of about 23 inches (58.4 cm) to about 33 inches (83.8 cm), and a third range of about 26 inches (66 cm) to about 28 inches (71.1 cm). In one implementation, the height 162 may be 27.375 inches (69.5 cm).

The halves 136a, 136b of the insert 134 can have a height 160 measured from the bottom edge 114 toward the opening 124. The height 160 may have a first range of about 1 inches (2.54 cm) to about 10 inches (25.4 cm), a second range of about 3 inches (7.6 cm) to about 8 inches (20.3 cm), and a third range of about 4 inches (10.2 cm) to about 6 inches (15.2 cm). In one implementation, the height 160 may be 5 inches (12.7 cm). As illustrated in FIG. 2A, each half 136a, 136b of the insert 134 may extend along the sidewalls 102, 104 the same distance. In alternative implementations, the first half 136a and the second half 136b can have different heights. In particular, as described above, the length 160 can be shorter than the length 162. In one or more implementations, the distance 160 comprises between about 5% and 50% of the length 162. In alternative implementations, the distance 160 comprises about 5%, 10%, 15%, 20%, 25%, 30%, 35%, 40%, or 45% of the length 162.

Figure 2B:
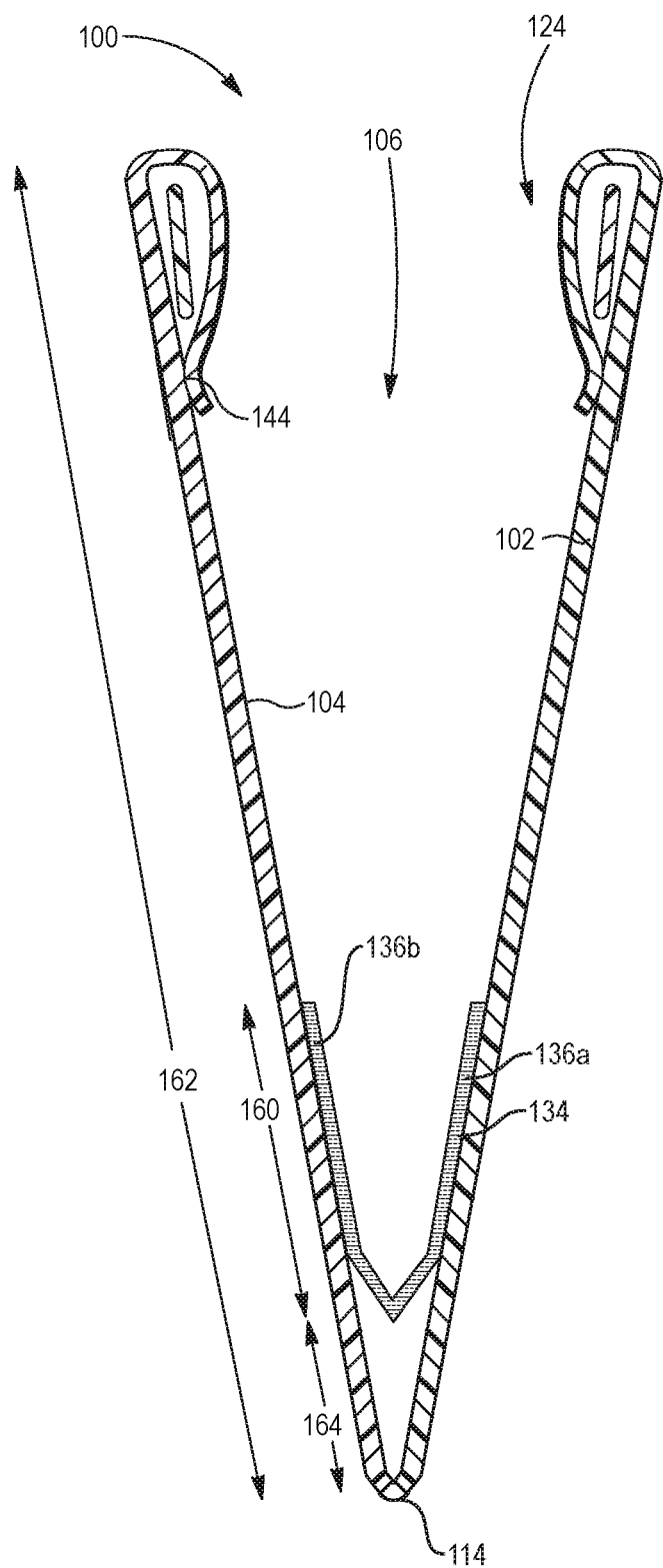
FIG. 2B illustrates another implementation of a cross-sectional view of the thermoplastic bag with liquid directing seals of FIG. 1, having a liquid absorbing insert, taken along the section line 2-2 of FIG. 1.

While FIG. 2A illustrates the insert 134 abutting directly against the bottom edge 114 of the bag 100, in alternative implementations the insert 134 can be spaced from the bottom edge of the bag 100. For example, FIG. 2B illustrates a cross-sectional view of another implementation of the thermoplastic bag with liquid directing structures 100 taken along the line 2-2 of FIG. 1, albeit with the insert 134 laminated to the sidewalls 102, 104 of the bag 100 at a distance 164 above the bottom edge 114 of the bag 100. The distance 164 measured from the bottom edge 114 toward the opening 124 can a first range of about 0.25 inches (0.635 cm) to about 10 inches (25.4 cm), a second range of about 0.5 inches (1.27 cm) to about 4 inches (10.2 cm), or a third range of 1 inch (2.54 cm) to about 2 inches (5.08 cm). In one implementation, the distance 164 may be 1 inch (2.54 cm).

In one or more implementations, the insert 134 being positioned at distance 164 from the bottom edge 114 can allow the insert 134 to stretch, move, or act independently to one degree or another from the sidewalls 102, 104. In such implementations, In particular, the insert 134 can act as a shock absorber and absorb at least some of the forces associated with loading objects (e.g., garbage or food) into the bag 100. In other words, the insert 134 can absorb at least some of the force associated with loading objects into the bag 100 in place of the sidewalls 102, 104. Thus, in addition to absorbing liquid, the insert 134 can decrease leaking by helping to prevent the sidewalls 102, 104 from tearing or puncturing.

While FIGS. 2A-2B illustrates a single layered bag 100, in other implementations, the thermoplastic bag with liquid directing structures can comprise a multi-layered bag (e.g., each of the sidewalls can include multiple layers). For example, FIG. 2C illustrates a cross-sectional view of another implementation 100a of the thermoplastic bag with liquid directing structures taken along the line 2-2 of FIG. 1, albeit with a bag-in-bag configuration.

Figure 2C:
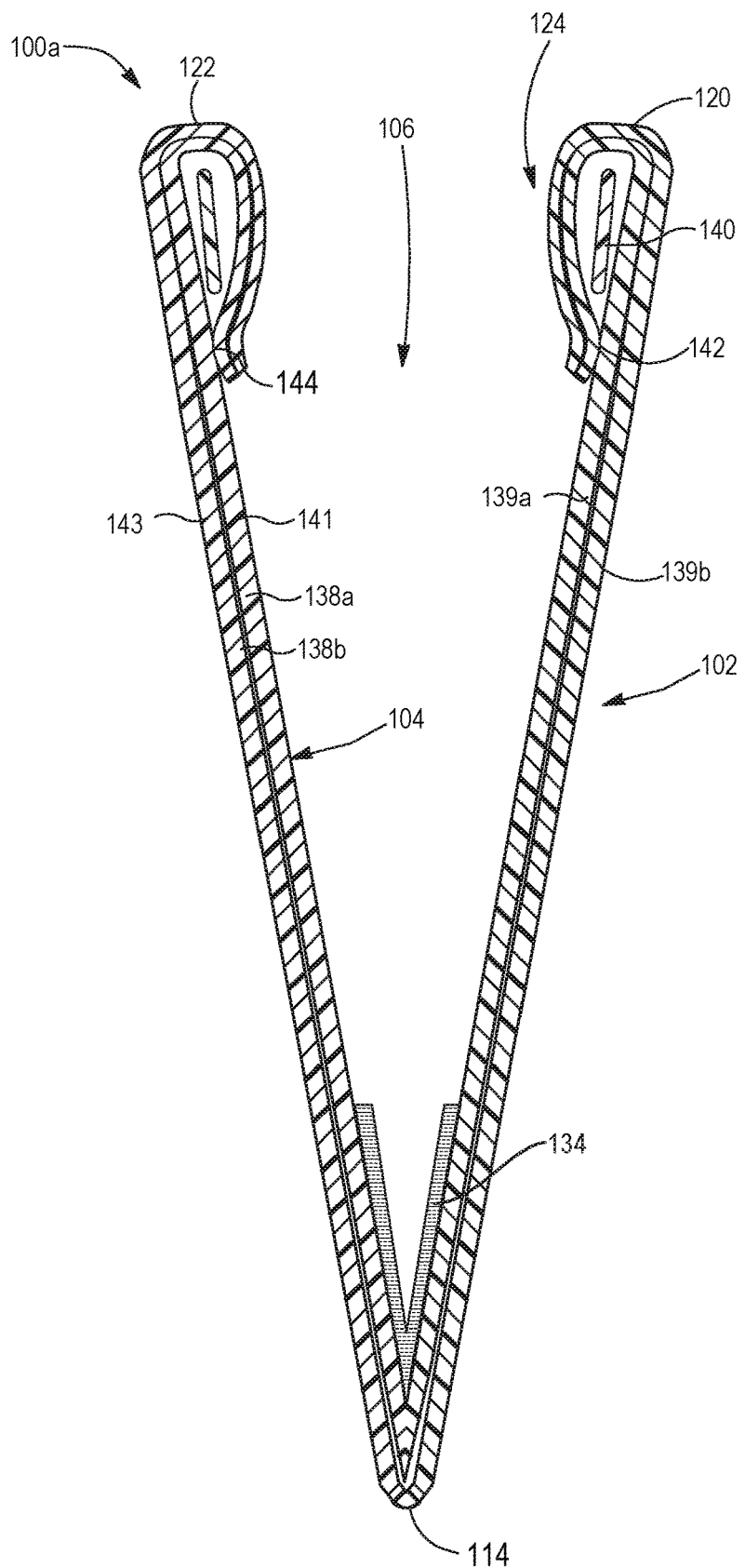
FIG. 2C illustrates yet another implementation of a cross-sectional view of the thermoplastic bag with liquid directing seals of FIG. 1, having a liquid absorbing insert, taken along the section line 2-2 of FIG. 1.

In particular, FIG. 2C illustrates a second layer or bag 141 is positioned within a first layer or bag 143. Such a configuration may be considered a "bag-in-bag" configuration. Each of the first and second layers or bags 141, 143 can include a pair of opposing sidewalls 102, 104 joined together along three edges as described above. The multi-layered thermoplastic bag with liquid directing structures 100a can also be considered as a bag with multi-layered sidewalls. For example, the first sidewall 102 can include a first film 139a and a second film 139b. Similarly, the second sidewalls 104 can include a first film 138a and a second film 138b. In such cases the liquid directing seals 115, 117 can seal the first layers 139a, 138a directly to the second layers 139b, 138b.

As mentioned previously, the insert 134 can comprise an absorbent material. For example, in one or more implementations, the insert 134 can comprise a mixture of absorbent material suspended in an adhesive matrix. In particular, the insert 134 can be made by intermixing an absorbent agent, such as a super absorbent polymer, with an adhesive. A super absorbent polymer can absorb and retain many times its own weight in water. Super absorbent polymers and copolyers include, but are not limited to, partially neutralized hydrogel-forming gelling materials, such as polyacrylate gelling material and acrylate grafted starch gelling material for example potassium acrylate and sodium acrylate, sodium polyacrylate, solution polymers, and super absorbent fibers. Sodium polyacrylate, for example, is a hydrophilic polymer material that can hold up to 20 times its weight in water and, in some instances, up to 50 times its weight in water. Super absorbent polymers are typically available as particulates or flake-like crystals that can be easily intermixed with and suspended in an adhesive matrix. In other implementations, instead of or in addition to the super absorbent polymer, the absorbent agent can be clay, silica, talc, diatomaceous earth, perlite, vermiculite, carbon, kaolin, mica, barium sulfate, aluminum silicates, sodium carbonates, calcium carbonates, absorbent gelling materials, creped tissue, foams, wood pulp, cotton, cotton batting, paper, cellulose wadding, sponges, and desiccants.

The adhesive matrix can be any suitable adhesive that demonstrates, at least initially, viscous properties that enable intermixing of the super absorbent polymer particles. The mixture of super absorbent polymers and adhesive can form a gel or paste that can be applied to the inner surfaces of the sidewalls. The adhesive can have elastic properties to accommodate swelling of the super absorbent polymer that may occur during liquid absorption. Examples of suitable types of adhesive include hot-melt, natural or synthetic waterborne, solventborne, extrudable, and pressure sensitive adhesives, and multi-component glues.

Figure 3:
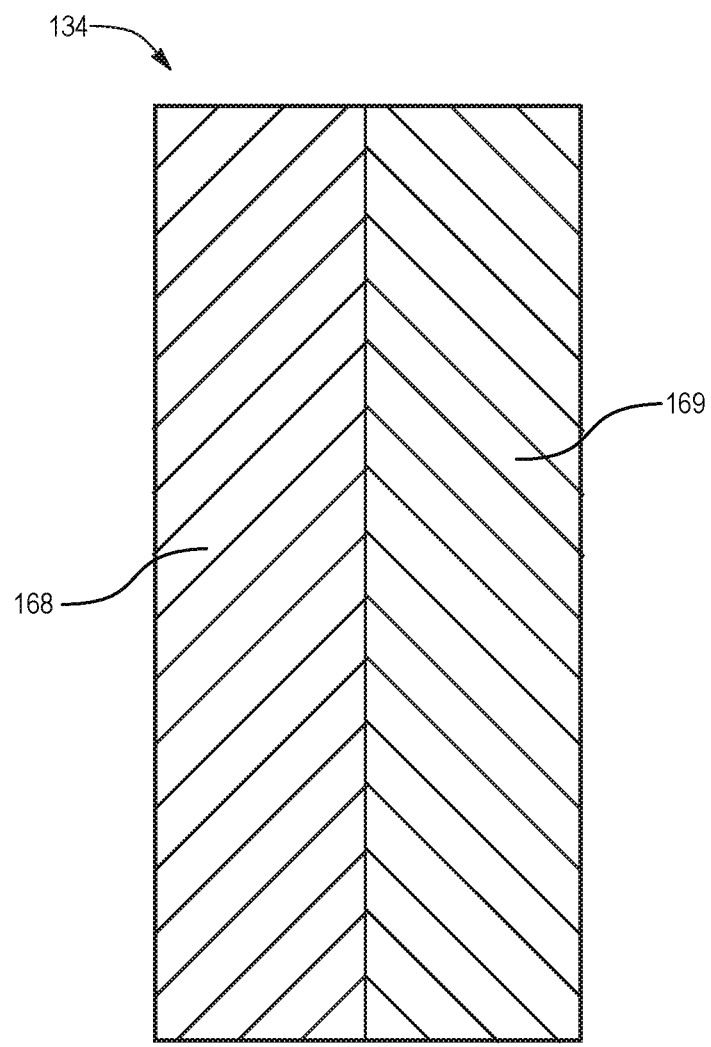
FIG. 3 is an expanded cross-sectional view of a liquid absorbing insert in accordance with one or more implementations of the present invention.

In one or more implementations, as shown in FIG. 3, an insert 134 can comprise a an adhesive matrix 168 and an additional layer 169. The adhesive matrix can comprise an adhesive and an absorbent material as described above or just and adhesive. Examples of suitable materials for the additional layer 169 include non-woven materials made from natural or synthetic fibers including wood pulp, cotton, rayon, polyester, olefins such as, for example, polypropylene, polyethylene, nylon, or polyester and the non-woven material can be formed by any suitable operation including air laid, carded, wet formed, extrusion, using bonding methods such as chemical bond, mechanical bond, and thermal bond, and processes such as melt blown, spunbond, hydroentangled, needle punched, batting, through-air, calendar, saturation, dry-laid or wet-laid. In the illustrated implementation, the additional layer 169 is provided as a flat, continuous, flexible substrate or strip that can be securely bonded by the adhesive layer 168 to the inner surface of the sidewalls.

The additional layer 169 can serve to absorb and retain fluids and juices that may be present in the bag. The additional layer 169 can be selected, or specially treated, to absorb and retain certain liquids that are repulsed or exuded by an absorbent-adhesive material. For example, typically super absorbent polymers are highly hydrophilic but tend not to absorb oils or other complex liquids. The additional layer 169 can absorb and trap these oils and complex liquids in the interstices between non-woven fibers and in the polymers. Hence, the combination of an absorbent-adhesive material 168 and the additional layer 169 within the bag 100 can therefore absorb and retain a variety of different liquids, thereby reducing potential leakage of the same.

The additional layer 169 of the insert 134 also provides other advantageous features and purposes. For example, liquids encountering the additional layer 169 can wick through the material so as to be distributed more evenly across the layer of absorbent-adhesive material 168. Additionally, the additional layer 169 of the insert 134 can provide support for the absorbent-adhesive mixture 138. More specifically, covering the layer of absorbent-adhesive mixture 138 with the additional layer 169 helps prevent the inner surfaces of the sidewalls 102, 104 from sticking to themselves or to any inserted contents because of the adhesive properties of the mixture. Furthermore, the added layers of absorbent-adhesive mixture(s) 138 and the additional layer 169 provides the sidewalls with additional resistance to punctures, breaks, and abrasion.

In other implementations, instead of utilizing a non-woven material, the additional layer 169 of the insert 134 can be made from other materials. For example, the additional layer 169 of the insert 134 can be made from a cellulous based material that similarly provides the absorbent properties and liquid distribution via wicking properties of a non-woven material. The substrate additional layer 169 of the insert 134 can also be made from wovens, thermoplastic films including apertured films and coextruded films, modified films including embossed or apertured, laminations, and co-extrusions that offer similar supportive properties for the absorbent-adhesive mixture. In still further embodiments in which the adhesive lacks absorbing material, the layer 169 can comprise an absorbent material (e.g., one or more of the absorbent materials described above).

In one or more embodiments, the layer 169 can be secured to the sidewalls by an attachment means other than an adhesive, such as, mechanical or chemical devices including tapes, two-sided tapes, hook and loop fasteners, hydrogen bonding, entrapment, heat sealing, and electrostatic charge, pressure bonding, etc.

In implementations in which the bags are intended for use as garbage can liners, it may be desirable to include odor neutralizing features to reduce malodorous smells generated from the contained garbage. Examples of odor neutralizing features are disclosed in U.S. patent application Ser. No. 10/717,099 (Publication No. US 2004/0134923), the content of which are incorporated by reference in its entirety. The odor neutralizing features may positively function to absorb, and thereby, remove the molecules that cause the malodorous smells. Additionally or alternatively, the odor neutralizing features may themselves generate a pleasant fragrance or scent that masks odorous and malodorous smells generated by the garbage, in effect acting like a perfume. Additionally or alternatively, odor absorbers, controllers, inhibitors and synergistic combinations may be used. The materials that provide the odor neutralizing features may be applied to or included in the absorbent-adhesive mixture, the substrate or the thermoplastic sidewalls by any suitable method. Odor absorbers may include molecules possessing a certain structural configuration that enables them to absorb and thus eliminate a broad array of odoriferous molecules.

Such materials include, for example, cyclodextrins, zeolites, activated carbon, kieselguhr, chelating agents, chitin, alkali metal carbonates and bicarbonates, metazene, chlorine dioxide, pH buffered materials such as carboxylic acids and the like. Some hydrogel-forming odor absorbing gelling materials, such a polyacrylate gelling material and acrylate grafted starch gelling material, are also useful and these materials also function as fluid absorbing materials. Odor inhibitors may include those components which interrupt the biological processes responsible for malodors, particularly the processes involving the decomposition of food wastes by bacterial and microbial activity. Odor inhibitors may include antimicrobial agents, chelants, and metallic salts. A synergistic combination may include a garbage bag with an odor-neutralizing composition including an odor-absorbing ingredient selected from the following group: cyclodextrin, activated charcoal, baking soda, absorbent gelling materials, zeolites, silica, and combinations thereof; a chelant; and, an antimicrobial agent.

As mentioned above, one or more implementations involve incrementally stretching one or more of the films of a thermoplastic bag with liquid directing structures. As explained below, incrementally stretching the film(s) can provide an overall thinner film employing a reduced amount of raw material that nonetheless has maintained or increased strength parameters. For example, one or more implementations includes incrementally stretching a film using MD ring rolling, TD ring rolling, DD ring rolling, the formation of strainable networks, or combinations thereof. Incrementally stretching a film using the methods described herein can impart ribs or other structures to the film and increase or otherwise modify one or more of the tensile strength, tear resistance, impact resistance, or elasticity of the film. Furthermore, one or more implementations involve stretching processes with ambient or cold (non-heated) conditions. This differs significantly from most conventional processes that stretch films under heated conditions. Stretching under ambient or cold conditions in accordance with one or more implementations can constrain the molecules in the film so they are not as easily oriented as under heated conditions. Such cold incremental stretching can help provide the unexpected result of maintaining or increasing the strength of a thermoplastic film, despite a reduction in gauge.

Figure 4:
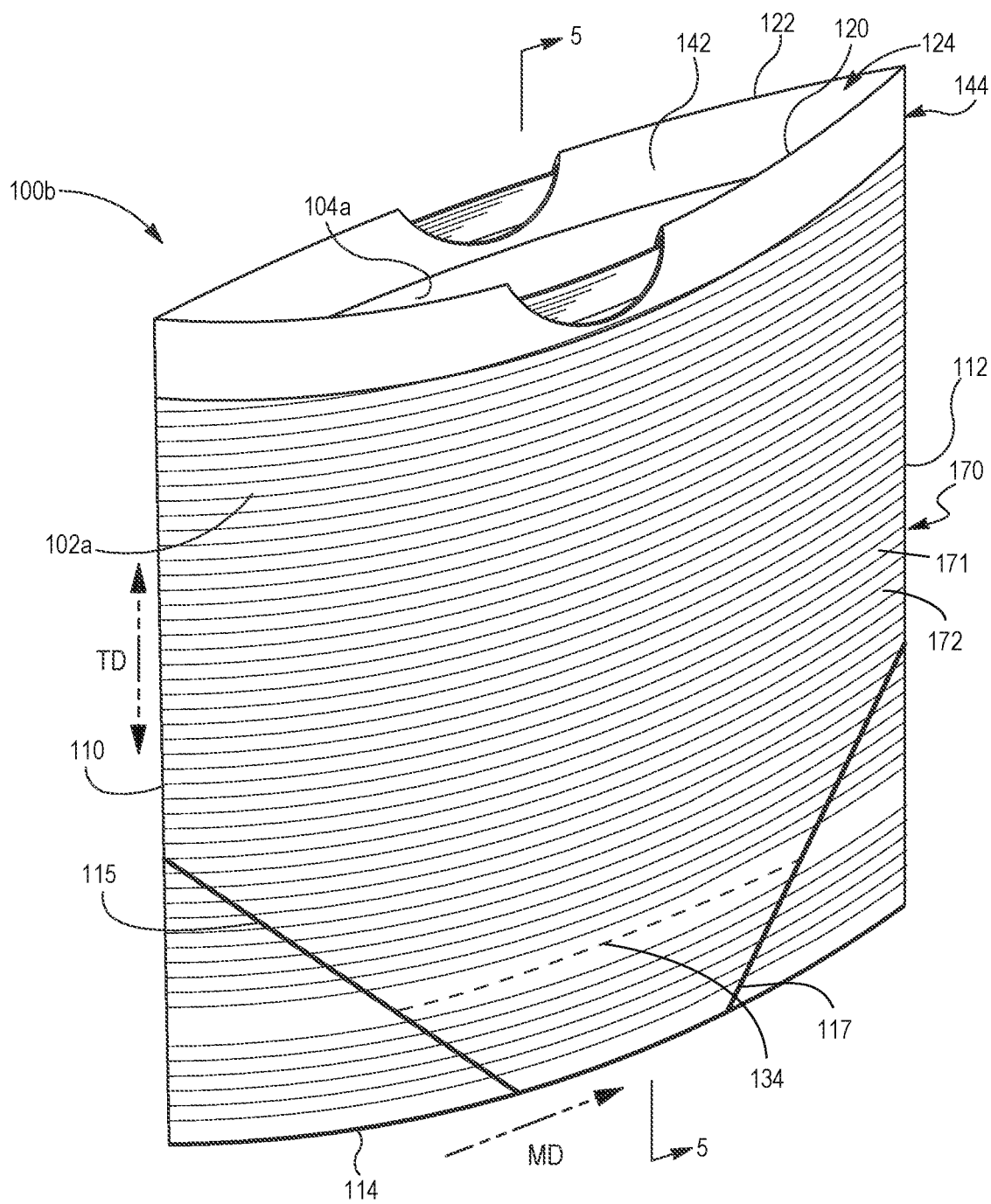
FIG. 4 illustrates a perspective view of another thermoplastic bag with liquid directing structures in accordance with one or more implementations of the present invention.

For example, FIG. 4 illustrates a thermoplastic bag with liquid directing structures 100*b* similar to the thermoplastic bags 100, 100*a*, albeit that the sidewalls 102*a*, 104*a* are incrementally stretched. In particular, the sidewalls 102*a*, 104*a* include a ribbed pattern 170 of a plurality of alternating thinner (e.g., stretched) linear webs 171 and thicker linear ribs 172 that may extend across the sidewalls 102*a*, 104*a* between the first side edge 110 and second side edge 112. As illustrated in FIG. 4, the webs 171 and ribs 172 may be parallel and adjacent to one another. Additionally, as illustrated in FIG. 4, the ribbed pattern 170 may extend from the bottom edge 114 toward the opening 124. To avoid interfering with the operation of the draw tape, the extension of the ribbed pattern 170 may terminate below the hem seals 142, 144. In alternative implementations, the ribbed pattern 170 can extend from the bottom edge 114 to the top edges 120, 122 of each sidewall. The ribbed pattern 170 can be formed by passing the films of the sidewalls 102*a*, 104*a* through a pair of transverse direction intermeshing ring rollers, such as those described in U.S. Pat. No. 9,669,595, the contents of which are hereby incorporated herein by reference in their entirety.

As shown by FIG. 4, the liquid directing seals 115, 117 can bond the webs 171 and ribs 172 of the first sidewall 102*a* to the webs 171 and ribs 172 of the second sidewall 104*a* such that liquid or fluid cannot pass through the liquid directing seals 115, 117 to the corners of the bag 100*b*. FIG. 4 further illustrates that the liquid directing seals 115, 117 can direct liquids to the absorbing insert 134.

Figure 5:
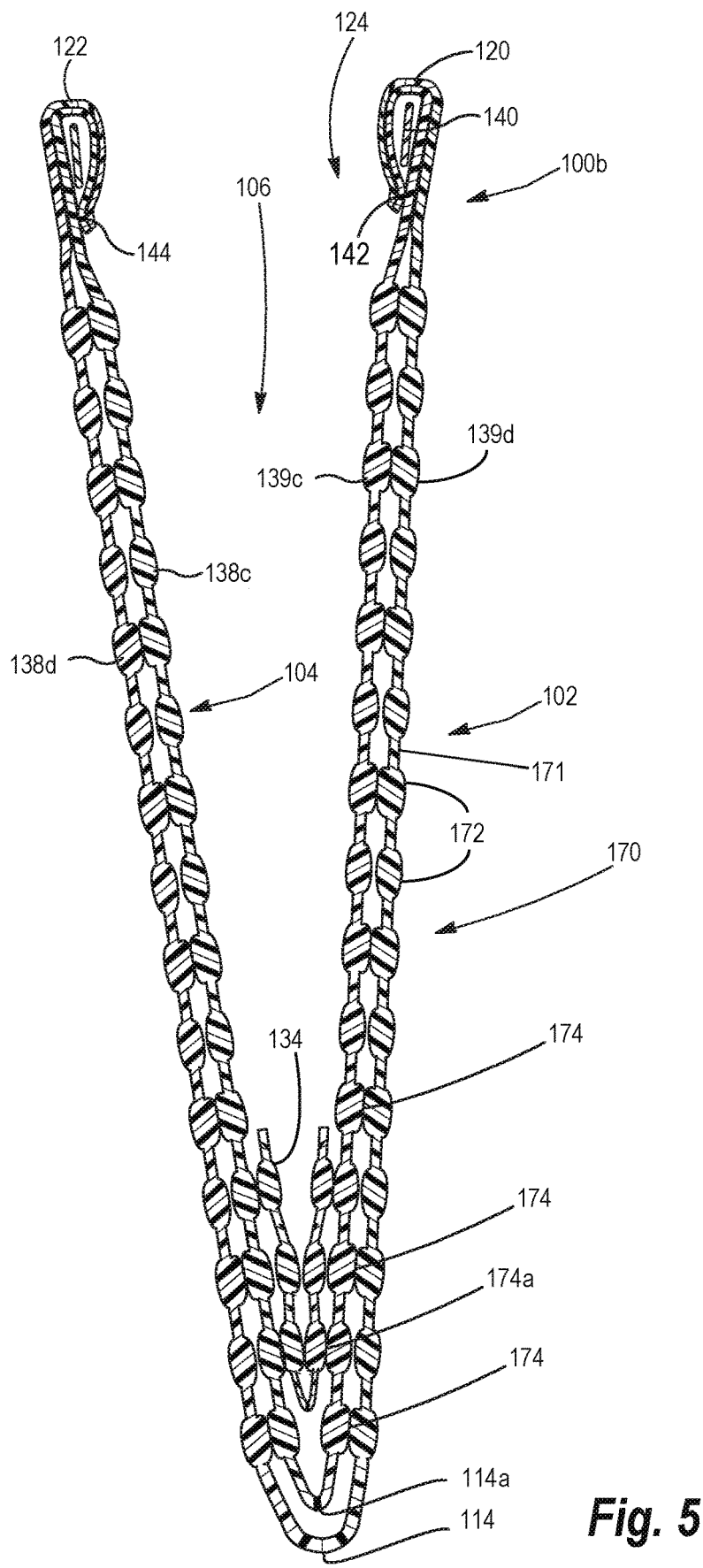
FIG. 5 illustrates a cross-sectional view of the thermoplastic bag with liquid directing seals of FIG. 4 taken along the section line 5-5 of FIG. 4.

FIG. 5 illustrates a cross-sectional view of the thermoplastic bag with liquid directing structures 100*b* of FIG. 4 taken along the line 5-5 of FIG. 4. FIG. 5 illustrates that the inner layer or bag 138*c*, 139*c* is bonded to the outer layer or bag 138*d*, 139*d*. In particular, a first plurality of non-continuous bonded regions or bonds 174 can secure the first and second layers 138*c*, 138*d*, 139*c*, 139*d* of the each sidewall together. Thus, the bonds 174 can comprise a pattern of linear bonds extending between the first side edge 110 and the second side edge 112 of each sidewall.

As shown by FIG. 5, in one or more implementations, the bonds 174 can bond thick linear ribs 172 of the inner layer or bag 138*c*, 139*c* to thick linear ribs 172 of the outer layer or bag 138*d*, 139*d*. FIG. 5 illustrates that the bonds 174 can secure some, but not all, of the thick linear ribs 172 of one layer to the thick linear ribs 172 of an adjacent layer. In particular, FIG. 5 illustrates that bonds 174 can secure every other thick linear rib 172 of adjacent layers together. In alternative implementations, bonds 174 can secure each thick linear rib 172 of adjacent layers together. Additionally, in one or more implementations the thinner webs 171 may be unbounded. Furthermore, the absorbing insert 134 can also be incrementally stretched and non-continuously bonded to the inner layer or bag 138*c*, 139*c* by bonds 174*a* as shown in FIG. 5.

In one or more implementations, the lamination strength between the layers of the thermoplastic bag with liquid directing structures 100*b* is purposefully weakened such that forces acting on the thermoplastic bag with liquid directing structures 100*b* are first absorbed by breaking the bond between layers rather than, or prior to, tearing or otherwise causing the failure of the layers of the thermoplastic bag with liquid directing structures 100*b*. In particular, the bonds between the films of the thermoplastic bag 100*b* can be tailored to fail when subjected to forces consistent with normal use of the thermoplastic bag. By configuring the bonds of the thermoplastic bag with liquid directing structures 100*b* to fail during normal use, the thermoplastic bag with liquid directing structures 100*b* can transition into two separate layers (e.g., an inner bag and an outer bag).

In particular, one or more implementations provide for forming bonds between adjacent films of the thermoplastic bag with liquid directing structures 100*b* that are relatively light such that forces acting on the thermoplastic bag 100*b* are first absorbed by breaking the bonds rather than, or prior to, tearing or otherwise causing the failure of the films of the thermoplastic bag with liquid directing structures 100*b*. Such implementations can provide an overall thinner structure employing a reduced amount of raw material that nonetheless has maintained or increased strength parameters. Alternatively, such implementations can use a given amount of raw material and provide a structure with increased strength parameters.

In particular, the light bonds or bond regions of adjacent films of thermoplastic bag with liquid directing structures 100*b* in accordance with one or more implementations can act to first absorb forces via breaking of the bonds prior to allowing that same force to cause failure of the individual films of the thermoplastic bag 100*b*. Such action can provide increased strength to the thermoplastic bag with liquid directing structures 100*b*. In one or more implementations, the light bonds or bond regions include a bond strength that is advantageously less than a weakest tear resistance of each of the individual films so as to cause the bonds to fail prior to failing of the films. Indeed, one or more implementations include bonds that the release just prior to any localized tearing of the layers of the thermoplastic bag with liquid directing structures 100b.

Thus, in one or more implementations, the light bonds or bond regions of a thermoplastic bag with liquid directing structures 100b can fail before either of the individual layers undergoes molecular-level deformation. For example, an applied strain can pull the light bonds or bond regions apart prior to any molecular-level deformation (stretching, tearing, puncturing, etc.) of the individual films. In other words, the light bonds or bond regions can provide less resistive force to an applied strain than molecular-level deformation of any of the layers of the thermoplastic bag with liquid directing structures 100b. The inventors have surprisingly found that such a configuration of light bonding can provide increased strength properties to the thermoplastic bag with liquid directing structures 100b as compared to a monolayer film of equal thickness or a non-continuously laminated structure in which the plurality of films are tightly bonded together or continuously bonded (e.g., coextruded).

One or more implementations of the present invention provide for tailoring the bonds or bond regions between layers of a thermoplastic bag with liquid directing structures 100b to ensure light bonding and associated increased strength. For example, one or more implementations include modifying or tailoring one or more of a bond strength, bond density, bond pattern, or bond size between adjacent layers of a thermoplastic bag with liquid directing structures 100b to deliver a structure with strength characteristics better than or equal to the sum of the strength characteristics of the individual films. Such bond tailoring can allow for a thermoplastic bag with liquid directing structures 100b at a lower basis weight (amount of raw material) to perform the same as or better than higher basis weight monolayer or co-extruded films. The bonds can be tailored such that they fail when subjected to forces and conditions consistent with normal use of a product incorporating the non-continuously laminated structure of thermoplastic films. For example, the bonds between the layers of the thermoplastic bag with liquid directing structures 100b can be tailored to fail when subjected to forces consistent with objects being placed into the garbage bag, consistent with the garbage bag being removed from a container (e.g., garbage can), or consistent with the garbage bag being carried from one location to another location.

In one or more implementations, the light lamination or bonding between films of a thermoplastic bag with liquid directing structures 100b may be non-continuous (i.e., discontinuous or partial discontinuous). As used herein the terms "discontinuous bonding" or "discontinuous lamination" refers to lamination of two or more layers where the lamination is not continuous in the machine direction and not continuous in the transverse direction. More particularly, discontinuous lamination refers to lamination of two or more layers with repeating bonded patterns broken up by repeating un-bonded areas in both the machine direction and the transverse direction of the film.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction, the transverse direction or both. Both partially discontinuous and discontinuous are types of non-continuous bonding (i.e., bonding that is not complete and continuous between two surfaces).

Relatively weak bonding and stretching can be accomplished simultaneously through one or more suitable techniques. For example, bonding and stretching may be achieved by pressure (for example MD ring rolling, TD ring rolling, helical or DD ring rolling, stainable network lamination, or embossing), or with a combination of heat and pressure. Alternately, a manufacturer can first stretch the films and then bond the films using one or more bonding techniques. For example, one or more implementations can include ultrasonic bonding to lightly laminate the films. Alternately or additionally, adhesives can laminate the films. Treatment with a Corona discharge can enhance any of the above methods. In one or more implementations, the contacting surfaces/layers can comprise a tacky material to facilitate lamination. Prior to lamination, the separate films can be film or can be subject to separate processes, such as stretching, slitting, coating and printing, and corona treatment.

While FIGS. 4 and 5 illustrate alternating thicker linear ribs and thinner linear webs that extend in the machine direction (e.g., incremental stretching in the transverse direction), other implementations thicker linear ribs and thinner linear webs that extend in the machine direction (e.g., incremental stretching in the machine direction) or a diagonal direction. In other words, one or more of the layers of the thermoplastic bag with liquid directing structures can be subjected to machine direction ring rolling or diagonal ring rolling as described in previously incorporated U.S. Pat. No. 9,669,595.

In still further implementations, the one or more of the layers of the thermoplastic bag with liquid directing structures can be subjected to SELFing as described in U.S. Pat. Nos. 9,669,595; 5,518,801; 6,139,185; 6,150,647; 6,394,651; 6,394,652; 6,513,975; 6,695,476; U.S. Patent Application Publication No. 2004/0134923; and U.S. Patent Application Publication No. 2006/0093766, the entire contents of each of the foregoing patents and patent applications are hereby incorporated by reference.

Figure 6:
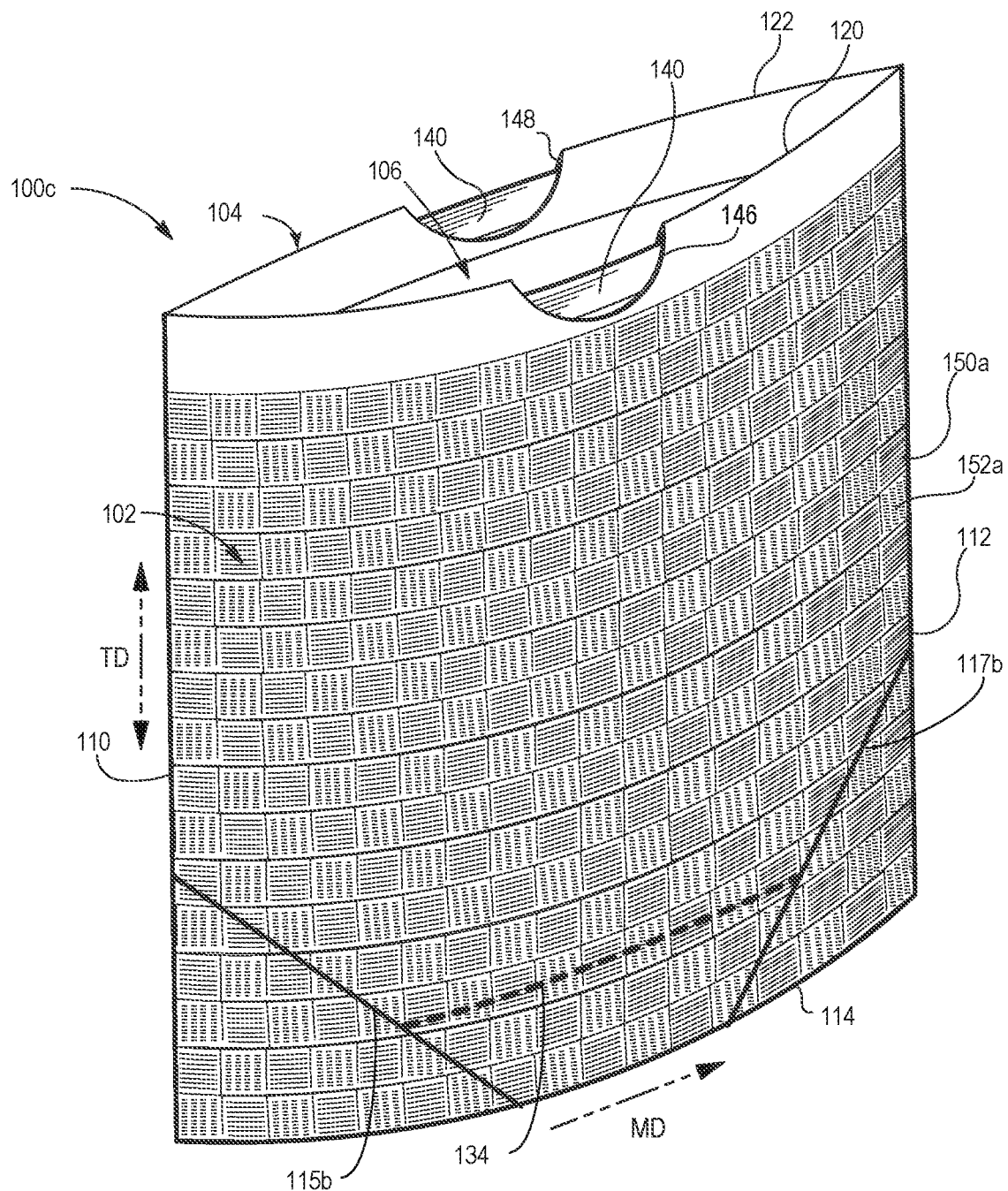
FIG. 6 illustrates a perspective view of yet another thermoplastic bag with liquid directing structures in accordance with one or more implementations of the present invention.

For example, FIG. 6 illustrates yet another thermoplastic bag with liquid directing structures 100c albeit with side walls that are SELF'ed. The thermoplastic bag with liquid directing structures 100c can include the same structure as the thermoplastic bag with liquid directing structures 100b albeit with a different pattern of intermittent bonds and thinner webs and thicker ribs. In particular, the thermoplastic bag with liquid directing structures 100c may include a single pattern of raised like elements arranged in a checkerboard pattern. The pattern can comprise a micro pattern of raised rib-like elements 152a and a macro pattern of raised rib-like elements 150a.

As shown by FIG. 6, the liquid directing seals 115b, 117b can bond the micro pattern of raised rib-like elements 152a and a macro pattern of raised rib-like elements 150a of the first and second sidewalls such that liquid or fluid cannot pass through the liquid directing seals 115b, 117b to the corners of the bag 100c. FIG. 6 further illustrates that the liquid directing seals 115b, 117b can direct liquids to the absorbing insert 134.

Figure 7:
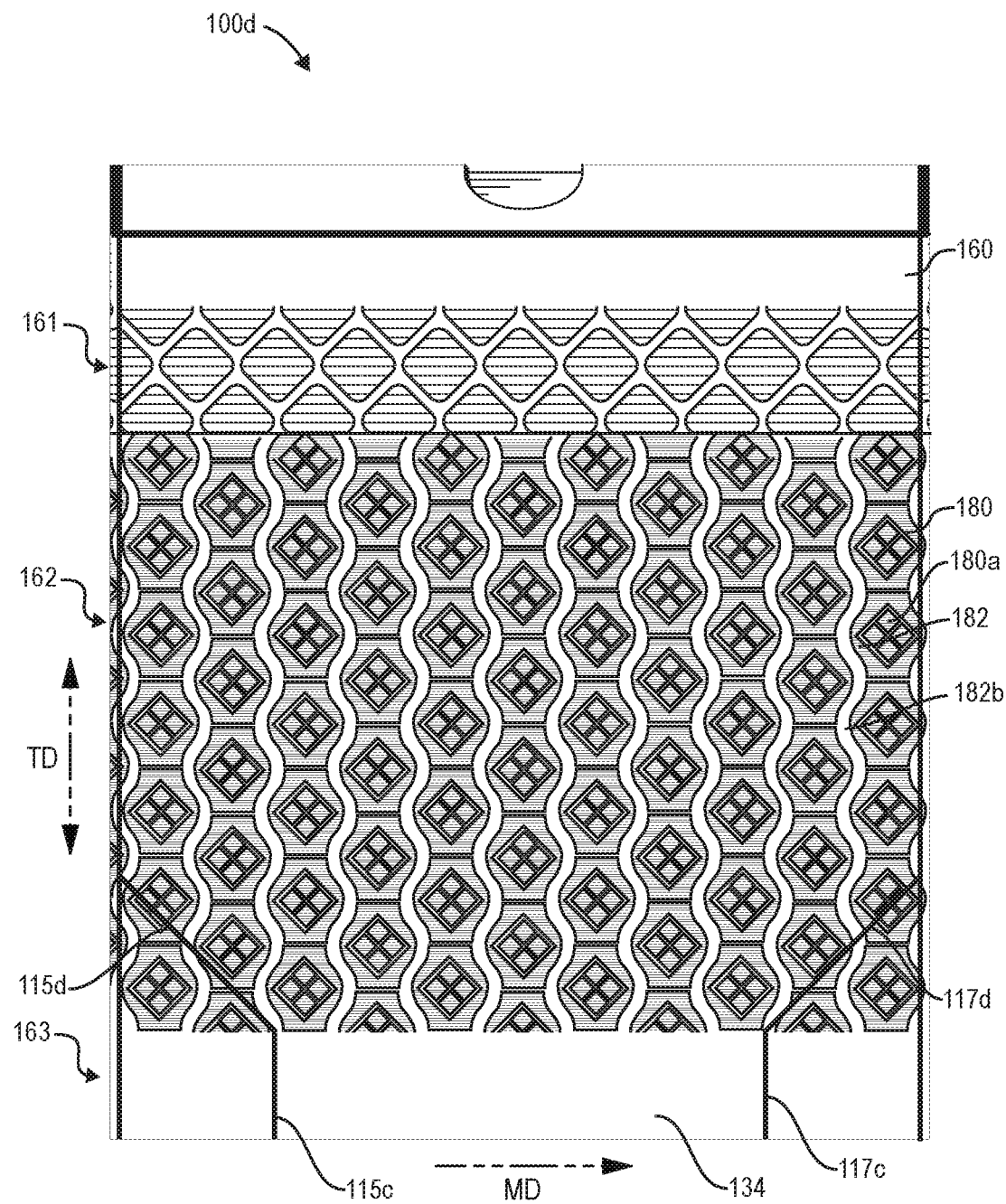
FIG. 7 illustrates a front view of another thermoplastic bag with liquid directing structures in accordance with one or more implementations of the present invention.

FIG. 7 shows another thermoplastic bag with liquid directing structures 100d with sidewalls having a first plurality of raised rib-like elements 182 in a macro pattern (e.g., a bulbous pattern) and a second plurality of raised rib-like elements 180a in a micro pattern (e.g., four diamonds) in a first middle portion 162. As shown, the second plurality of raised rib-like elements 180a in the micro pattern are nested within the macro patterns. Furthermore, the thermoplastic bag with liquid directing structures 100d includes web areas 180, 182b. The web areas 180, 182b can surround the micro and the macro patterns of raised rib-like elements. The plurality of web areas 180, 182b comprise areas in which the first layer and the second layer are separated to form intermittent bonding between the layers (i.e., the inner bag and the outer bag). Furthermore, as shown by FIG. 7, the web areas 182b are arranged in a sinusoidal pattern. The web areas 182b, similar to the liquid directing heat seals, can guide or direct fluids to the liquid absorbing insert 134. In other embodiments, the web areas or the ribs can guide or direct fluids to the bottom, center, or bottom center of the bag. For example, the web areas or the ribs can extend from the side seals inward and downward toward the liquid absorbing insert 134.

Additionally, FIG. 7 illustrates that the thermoplastic bags described herein can include areas with different patterns. In particular, FIG. 7 illustrates an upper portion 161 of the thermoplastic bag with liquid directing structures 100d includes a fenced diamond pattern. The fenced diamond pattern can comprise raised-rib-like elements arranged in diamond patterns where the intersections of the sides of the diamond are rounded rather than ending in corners. The fenced diamond pattern can also comprise web areas comprise areas in which the first layer and the second layer are separated to form intermittent bonding between the layers (i.e., the inner bag and the outer bag).

The thermoplastic bag with liquid directing structures 100d can further comprise areas lacking bonding such as the area 163 adjacent the bottom of the bag and area 160 proximate the hem of the bag. The areas 160, 163 comprise areas in which the first layer and the second layer are separated and unbonded.

While the thermoplastic bags with liquid directing structures shown above each include linearly extending liquid directing seals. One will appreciate that in alternative implementations the liquid directing seals can comprise other configurations. For example, the thermoplastic bag with liquid directing structures 100d can include a first liquid directing seals 115d, 117d extending from the side seals toward the bottom edge of the bag 100d. As shown, the first liquid directing seals 115d, 117d can extend only a portion (i.e., not the entire) of the distance from the side seals to the bottom edge. As shown, the thermoplastic bag with liquid directing structures 100d can include second liquid directing seals 115c, 117c that extend from the bottom edge of the bag 100d toward the top of the bag 110d until reaching the first liquid directing seals 115d, 117d. In one or more implementations, the second liquid directing seals 115c, 117c extend parallel to the side seals and perpendicular from the bottom edge.

FIG. 7 further illustrates that the liquid directing seals 115c, 115d, 117c, 117d can direct liquids to the absorbing insert 134. More particular, the absorbing insert 134 can be positioned between the second liquid directing seals 115c, 117c.

Figure 8:
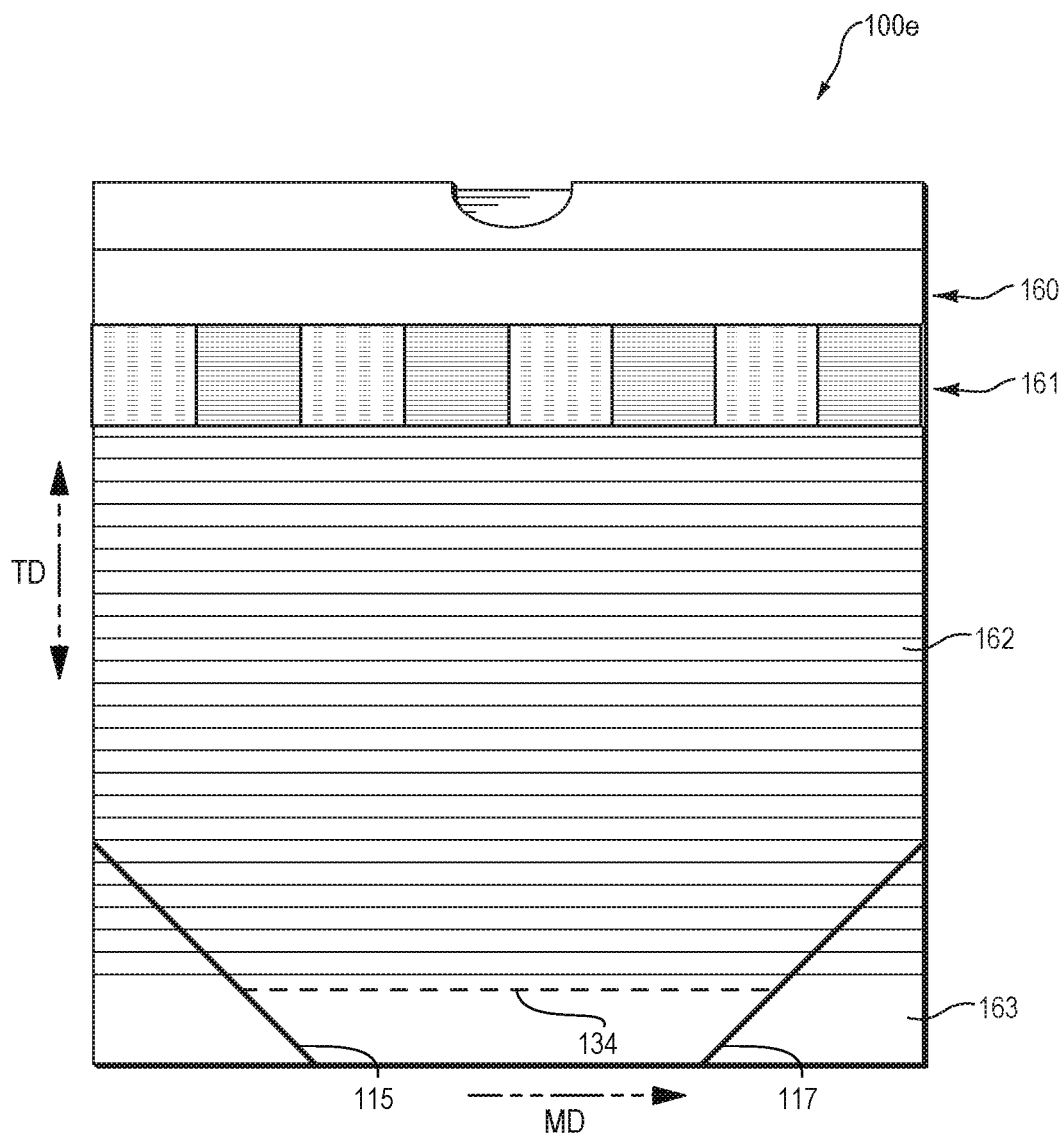
FIG. 8 illustrates a front view of thermoplastic bag with liquid directing structures in accordance with one or more implementations of the present invention.

While the thermoplastic bags described above include bonding patterns of a single type (SELFing bonds or ring rolling bonds), thermoplastic bag with liquid directing structures can comprise multiple different types of bonding. For example, FIG. 8 illustrates another thermoplastic bag with liquid directing structures 100e with one section 161 comprising bonds formed by SELFing (e.g., the checkerboard pattern described above), while another section 162 includes a TD ring rolling pattern. Furthermore, liquid directing seals 115, 117 can direct liquids to the absorbing insert 134.

Figure 9:
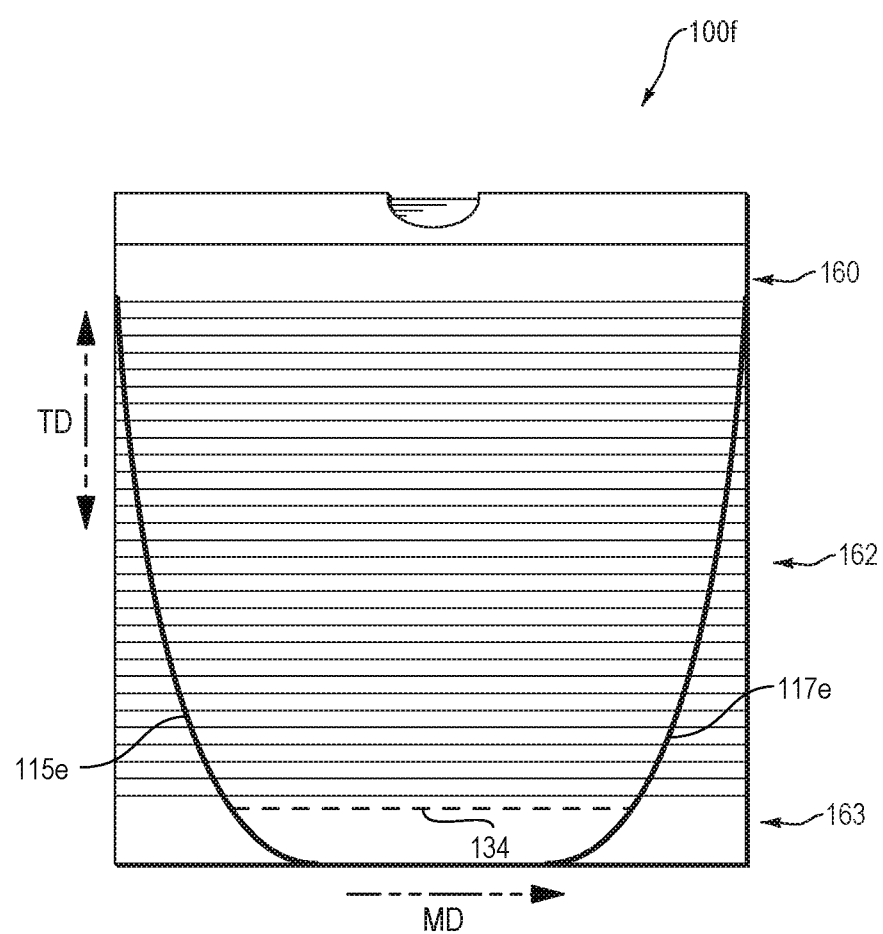
FIG. 9 illustrates a front view of another thermoplastic bag with liquid directing structures in accordance with one or more implementations of the present invention.

While the bags described above include linear liquid directing structures, bags of one or more implementations can comprise curved seals. For example, FIG. 9 illustrates another thermoplastic bag 100f with curved liquid directing seals 115e, 117e that direct fluid toward an absorbing insert 134. In particular, the curved liquid directing seals 115e, 117e extend from the side seal of the bag 100f to the bottom edge of the bag 100f along a curved line. While FIG. 9 illustrates the curved liquid directing seals 115e, 117e starting at the top of the bag 100f, as with the other implementations, the curved liquid directing seals 115e, 117e can start at another position between the bottom and top edges. For example, the curved liquid directing seals 115e, 117e can start halfway up the bag from the bottom edge, a quarter of the way up the bag, an eighth of the way up the bag from the bottom edge, a tenth of the way up the bag, or another distance from the bottom edge.

Figure 10:
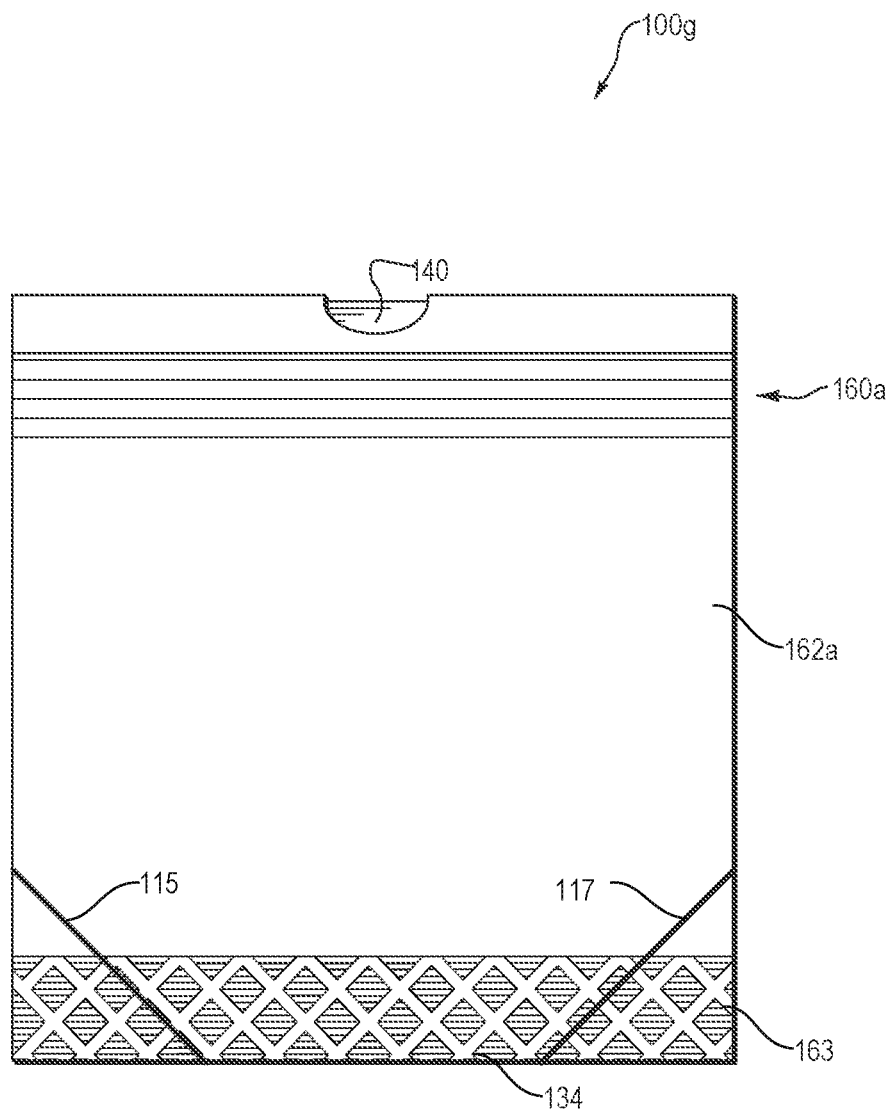
FIG. 10 illustrates a front view of yet another thermoplastic bag with liquid directing structures in accordance with one or more implementations of the present invention.

As discussed above, the absorbing inserts can be bonded to the sidewalls of the bags in many different manners. For example, in the case where the absorbing insert comprises a super absorbent polymer suspended in an adhesive, the tacky nature of the absorbing insert itself can provide the bonding mechanism. In alternative implementations, the absorbing insert can be bonded to the sidewalls of a bag using a separate adhesive or any of the lamination methods described above. For example, FIG. 10 illustrates another thermoplastic bag with liquid directing structures 100g with an absorbing insert 134 bonded to the bag via intermittent bonds provided by SELFing a bottom portion of the bag 163 together with the absorbing insert 134. The thermoplastic bag with liquid directing structures 100g also includes an upper section 160a with stretched by TD ring rolling and a middle section 162a devoid of bonds and stretching. As shown by FIG. 10, the thermoplastic bag with liquid directing structures 100g can include liquid directing seals 115, 117 that direct liquid toward the absorbing insert 134.

Figure 11:
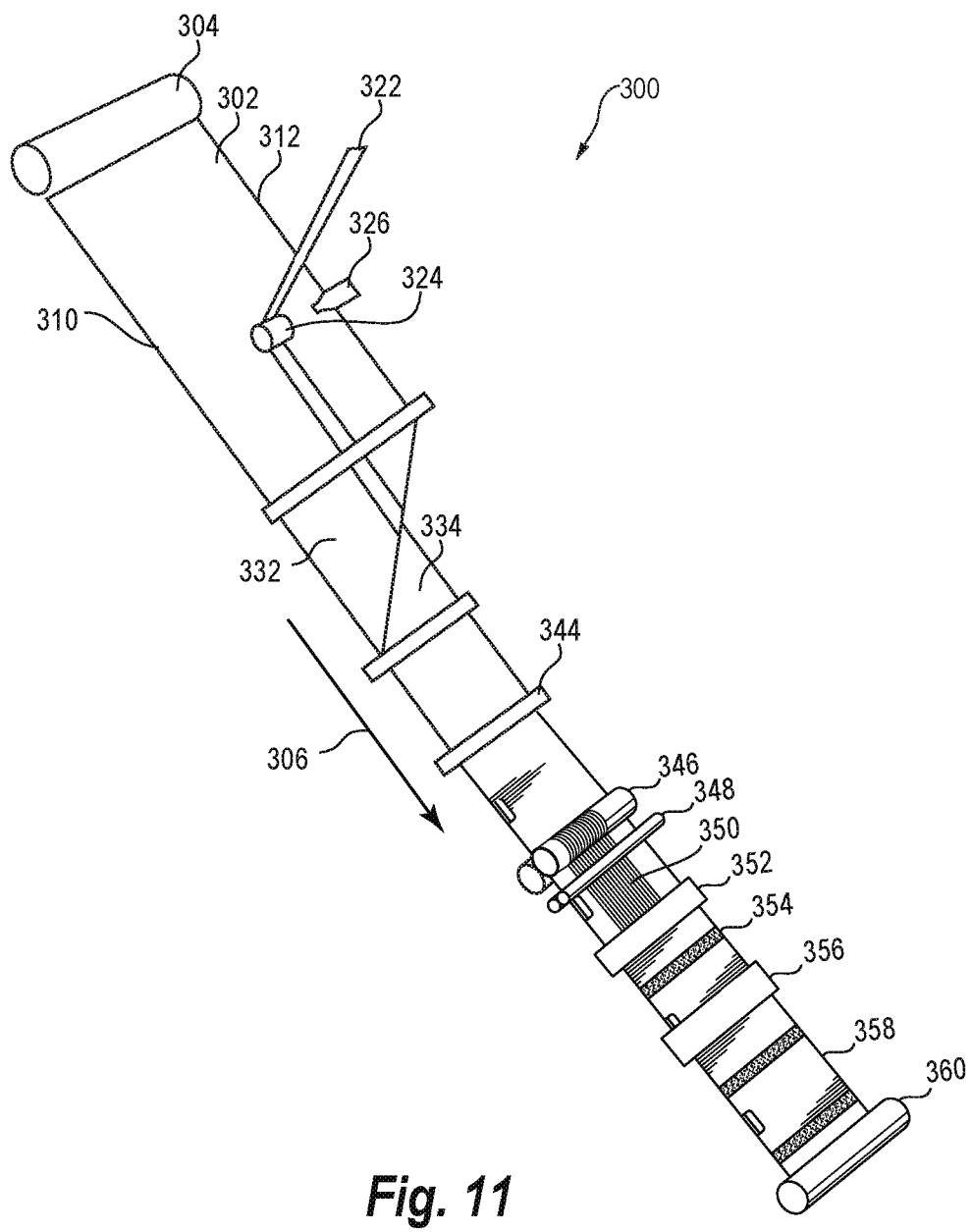
FIG. 11 illustrates a schematic diagram of a manufacturing process for producing thermoplastic bags with liquid directing structures in accordance with one or more implementations of the present invention.
Figure 12A:
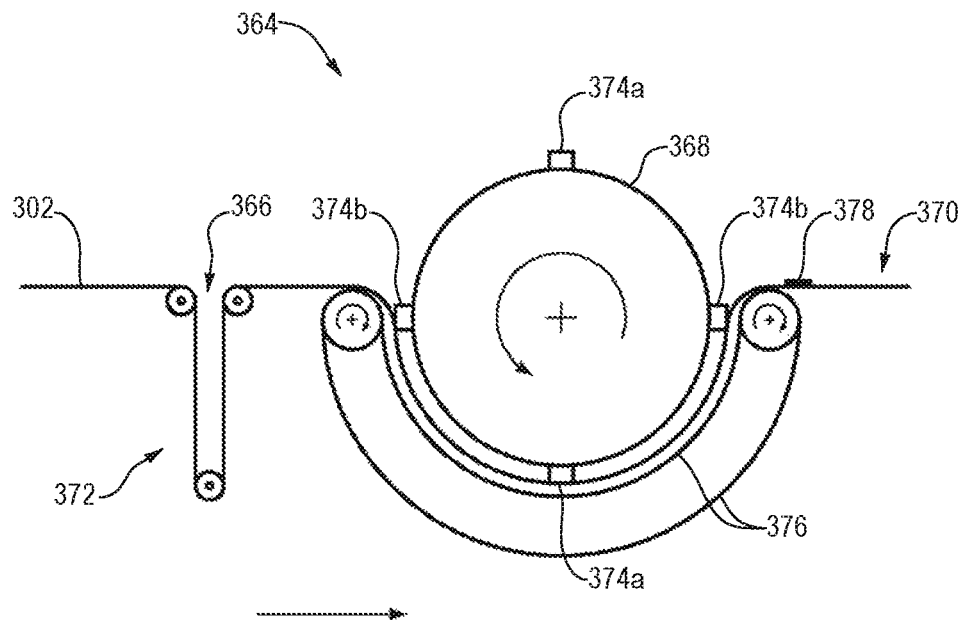
FIGS. 12A-12B illustrates a schematic diagram of a heat seal creation process in accordance with one or more implementations of the present invention.
Figure 12B:
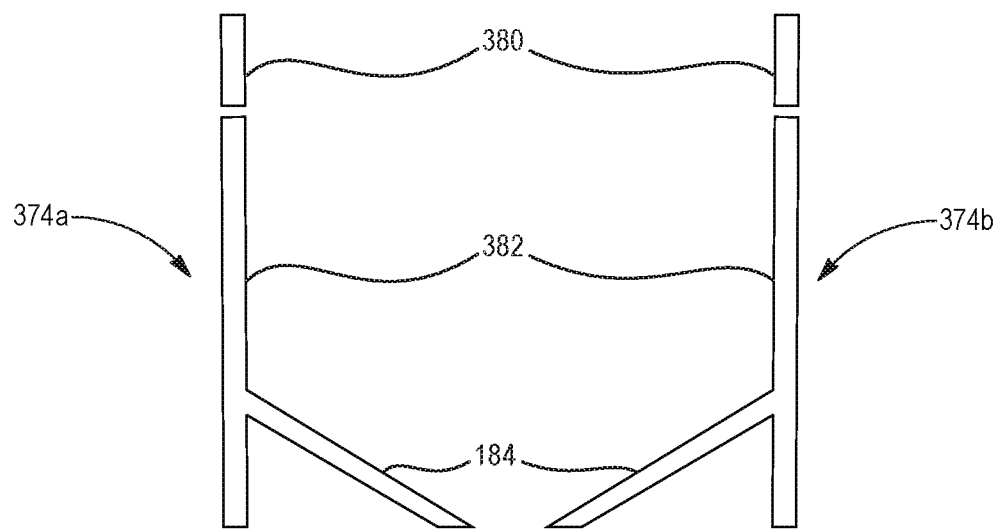

One or more implementations of the present invention can also include methods of forming thermoplastic bags with liquid directing structures. FIGS. 11 and 12A-12B and the accompanying description describe such methods. Of course, as a preliminary matter, one of ordinary skill in the art will recognize that the methods explained in detail herein can be modified. For example, various acts of the method described can be omitted or expanded, additional acts can be included, and the order of the various acts of the method described can be altered as desired.

Referring to FIG. 11, a schematic of an implementation for high-speed automated manufacturing of bags process 300 is shown. In the illustrated implementation, the process 300 may begin by unwinding a web 302 of thermoplastic sheet material from a roll 304 and advancing the web along a machine direction 306. The unwound web 302 may have a rectangular profile including a width that is perpendicular to the machine direction 306 as measured between a first edge 310 and an opposite second edge 312. In other manufacturing environments, the process may involve extruding the web 302 using a thermoplastic production process.

The process 300 can then involve advancing the continuous strip 322 of thermoplastic material intended to become the insert toward the web 302. In particular, the process 300 can involve redirecting the strip 322 to proceed in parallel and in step with the advancing web 302 along the machine direction 306. The thermoplastic strip 322 may initially be provided from a roll, like the web, or may be directly extruded. During redirection, the process 300 can involve orienting the strip 322 about mid-width of the web 302 between the first and second edges 310, 312 by a roller 324.

To facilitate attaching the strip 322 to the web 302, the process can involve heating the roller 324. Heating of the thermoplastic material of the strip 322 may transition the strip material to a phase or physical state in which it may more readily bond with the thermoplastic material of the web 302.

Besides, or in addition to, heating the roller 324, the process 300 can involve directing an adhesive 326 onto the web and/or strip. In some implementations, adhesive 326 can comprise an absorbent material. In other implementations, the strip 322 comprises an absorbent material and the adhesive is used solely to attach the strip 322.

Subsequently, the process can involve folding the web 302 about its width and inline with the machine direction 306 to provide adjacent first and second folded halves 332, 334. The folding of the web 302 may cause the second edge 312 to move adjacent to the first edge 310 such that the two edges correspond to the opened top edge of the finished bag. The mid-width portion of the web 302 with the strip 322 attached thereto may correspond to the reinforced bottom edge portion of the finished bag which may move in parallel with the machine direction 306. Additionally, the folded-over halves 332, 334 of the web 302 correspond to the first and second sidewalls of the finished bag.

In one or more embodiments, the addition of the strip 322 can take place after the folding process rather than before. In particular, the method can involve separating the folded-over halves 332, 334 and inserting the strip 322 in between the folded-over halves 332, 334.

Additional processing steps may be applied to produce the finished bag. In particular, the process 300 can include a draw tape insertion process 344 that involves inserting a draw tape into ends 310, 312 of the web 302.

To bond (and optionally stretch) the halves of the web, the processing equipment may include a pair of intermeshing rollers 346 such as those described herein above. The folded web halves 332, 334 may be advanced along the machine direction 306 between the intermeshing rollers 346, which may be set into rotation in opposite rotational directions to impart the resulting bonding pattern 350. To facilitate patterning of the web halves 332, 334, the intermeshing rollers 346 may be forced or directed against each other by, for example, hydraulic actuators. The pressure at which the rollers are pressed together may be in a first range from 30 PSI (2.04 atm) to 100 PSI (6.8 atm), a second range from 60 PSI (4.08 atm) to 90 PSI (6.12 atm), and a third range from 75 PSI (5.10 atm) to 85 PSI (5.78 atm). In one or more implementations, the pressure may be about 80 PSI (5.44 atm).

In the illustrated implementation, the intermeshing rollers 346 may be arranged so that they are co-extensive with or wider than the width of the web halves 332, 334. In one or more implementations, the bonding pattern 350 created by intermeshing rollers 346 may extend from proximate the folded edge to the adjacent edges 310, 312. To avoid imparting the bonding pattern 350 onto the portion of the web halves 332, 334 that includes the draw tape, the corresponding ends of the intermeshing rollers 346 may be smooth and without the ridges and grooves. Thus, the adjacent edges 310, 312 and the corresponding portion of the web halves 332, 334 proximate those edges that pass between the smooth ends of the intermeshing rollers 346 may not be imparted with the bonding pattern 368.

The processing equipment may include pinch rollers 348 to accommodate the width of the web halves 332, 334. To produce the finished bag, the processing equipment may further process the web halves 332, 334. For example, to form the parallel side edges of the finished bag, the web halves 332, 334 may proceed through a sealing operation 352 in which heat seals 354 may be formed between the folded edge and the adjacent edges 310, 312. The heat seals may fuse together the adjacent web halves 332, 334. The heat seals 354 may be spaced apart along the web halves 332, 334 and in conjunction with the folded outer edge may define individual bags. The heat seals may be made with a heating device, such as, a heated knife or a sealing bars as described in greater detail below. A perforating operation 356 may perforate the heat seals 354 with a perforating device, such as, a perforating knife so that individual bags 358 may be separated from the web 302. In one or more implementations, the web halves 332, 334 may be folded one or more times before the folded web halves 332, 334 may be directed through the perforating operation. The web halves 332, 334 embodying the bags 358 may be wound into a roll 360 for packaging and distribution. For example, the roll 386 may be placed in a box or a bag for sale to a customer.

In one or more implementations of the process, a cutting operation may replace the perforating operation 356. The web is directed through a cutting operation which cuts the web halves 332, 334 at location into individual bags 358 prior to winding onto a roll 360 for packaging and distribution. For example, the roll 360 may be placed in a box or bag for sale to a customer. The bags may be interleaved prior to winding into the roll 360. In one or more implementations, the web halves 332, 334 may be folded one or more times before the folded web is cut into individual bags. In one or more implementations, the bags 358 may be positioned in a box or bag, and not onto the roll 360.

A more detailed schematic of a sealing process 364 of forming the edge heat seals and the liquid directing seals is illustrated in FIG. 12A. The sealing process 364 can be part of a continuous bag-making process as described above in relation to FIG. 11. As shown in FIG. 12A, the continuous sealing process 364 includes an input section 366, a rotary drum 368, and an output section 370. The web 302 continuously travels from the input section 366 to the rotary drum 368 and then to the output section 370.

The input section 366 generally consists of a driven dancer assembly 372 to control film tension. The rotary drum 368 contains a pairs of heated seal bars 374a, 374b which can press against a sealing blanket 376 to make seals 378 (e.g., edge heat seals and liquid directing heat seals). The continuous sealing process 364 has the advantage of operating at very high speeds (600 ft./min=300 bags/min).

The continuous bag making process 180 can additionally be used to make the side seals, the tape or hem seals, and the liquid directing seals described above. Because the tape seals can involve more plies of material or different materials compared with the side seals and liquid directing seals, the seal bars 374a, 374b can be divided into two individual seal bars. In particular, the seal bars can include a long seal side seal bar 382 and a shorter tape seal bar 380, as shown in FIG. 12B. Because the bag may have different plies of material in the side seals and the tape seals, the side seal bars 382 may have different heating properties from the tape seal bar 380. For example, the tape seal bar 380 may be heated to a higher temperature to penetrate the additional plies in the tape seals. Furthermore as shown by FIG. 18B, in one or more implementations the seal bars can comprise a liquid directing seal bar 184 that extends away from the side seal bars 382. As shown in FIG. 12B, the liquid directing seal bar 184 of the first seal bar 374a can extend in a different direction than the a liquid directing seal bar 184 of the second seal bar 374b.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. Moreover, any combination of the above-described elements in all possible variations thereof is encompassed by the invention unless otherwise indicated herein or otherwise clearly contradicted by context. All changes that come within the meaning and range of equivalency of the claims are to be embraced within their scope.

We claim:

1. A thermoplastic bag, comprising:
    first and second opposing sidewalls joined together along a first side edge, an opposite second side edge, and a bottom edge, the first and second opposing sidewalls being un-joined along at least a portion of their respective top edges to define an opening;
    a first liquid directing structure extending from the first side edge to the bottom edge, wherein the first liquid directing structure in an initial integral state prevents liquid from reaching a first corner of the thermoplastic bag where the first side edge and the bottom edge intersect; and
    a second liquid directing structure extending from the second side edge to the bottom edge, wherein the second liquid directing structure in an initial integral state prevents liquid from reaching a second corner of the thermoplastic bag where the second side edge and the bottom edge intersect; and
    a liquid absorbing material positioned at a bottom of the thermoplastic bag between the first and second liquid directing structures,
    wherein the first and second liquid directing structures comprise bonds with a bond strength configured to de-laminate at a predetermined force that is less than a force that will cause failing of the first and second opposing sidewalls; and
    wherein the first and second liquid directing structures after de-lamination in a second de-laminated state allow accesses to the first and second corners.

2. The thermoplastic bag as recited in claim 1, wherein the first and second liquid directing structures comprise one of pressure bonds or ultrasonic bonds.

3. The thermoplastic bag as recited in claim 1, wherein:
    the first liquid directing structure extends from the first side edge to the bottom edge in a straight line; and
    the second liquid directing structure extends from second first side edge to the bottom edge in a straight line.

4. The thermoplastic bag as recited in claim 1, wherein:
    the first liquid directing structure extends from the first side edge to the bottom edge in a curved line; and
    the second liquid directing structure extends from the second side edge to the bottom edge in a curved line.

5. The thermoplastic bag as recited in claim 1, wherein the liquid absorbing material is part of an insert.

6. The thermoplastic bag as recited in claim 5, wherein the insert comprises the liquid absorbing material suspended in an adhesive.

7. The thermoplastic bag as recited in claim 6, wherein the liquid absorbing material is secured to the first and second opposing sidewalls by the adhesive.

8. The thermoplastic bag as recited in claim 1, wherein the liquid absorbing material comprises a super absorbent polymer.

9. The thermoplastic bag as recited in claim 8, wherein the super absorbent polymer comprises sodium polyacrylate.

10. The thermoplastic bag as recited in claim 5, wherein the insert entirely covers the bottom edge between the first and second liquid directing structures.

11. The thermoplastic bag as recited in claim 1, wherein the liquid absorbing material is part of an insert comprising a strip of thermoplastic material.

12. The thermoplastic bag as recited in claim 11, wherein the insert reinforces the bottom of the bag.

13. A thermoplastic bag, comprising:
    first and second opposing sidewalls joined together along a first side edge, an opposite second side edge, and a bottom edge, the first and second opposing sidewalls being un-joined along at least a portion of their respective top edges to define an opening;
    a first liquid directing structure extending from the first side edge to the bottom edge;
    a second liquid directing structure extending from the second side edge to the bottom edge, wherein the first and second liquid directing structures reduce a length of an interior bottom of the thermoplastic bag; and
    a liquid absorbing insert positioned at an interior bottom of the thermoplastic bag between the first and second liquid directing structures;
    wherein the first and second liquid directing structures comprise bonds with a bond strength configured to de-laminate at a predetermined force that is less than a force that will cause failing of the first and second opposing sidewalls.

14. The thermoplastic bag as recited in claim 13, wherein the bonds of the first and second liquid directing structures comprise SELFing bonds.

15. The thermoplastic bag as recited in claim 13, wherein the liquid absorbing insert comprises a liquid absorbing strip of thermoplastic material.

16. The thermoplastic bag as recited in claim 13, wherein the liquid absorbing insert comprises a super absorbent polymer suspended in an adhesive and a strip of material secured to the first and second opposing sidewalls by the adhesive.

17. The thermoplastic bag as recited in claim 16, wherein the super absorbent polymer comprises sodium polyacrylate.

18. The thermoplastic bag as recited in claim 13, wherein the liquid absorbing insert is positioned a distance from the interior bottom of the thermoplastic bag.

19. The thermoplastic bag as recited in claim 13, wherein the first and second opposing sidewalls comprise multiple thermoplastic films non-continuously bonded together.

20. The thermoplastic bag as recited in claim 13, wherein the liquid absorbing insert entirely covers the bottom edge between the first and second liquid directing structures.

* * * * *